(12) United States Patent
Smith (10) Patent No.: US 7,782,256 B2
(45) Date of Patent: Aug. 24, 2010

(54) ENHANCED PASSIVE COHERENT LOCATION TECHNIQUES TO TRACK AND IDENTIFY UAVS, UCAVS, MAVS, AND OTHER OBJECTS

(75) Inventor: Alexander E. Smith, McLean, VA (US)

(73) Assignee: Era Systems Corporation, Reston, VA (US)

( * ) Notice: Subject to any disclaimer, the term of this patent is extended or adjusted under 35 U.S.C. 154(b) by 348 days.

(21) Appl. No.: 11/749,045

(22) Filed: May 15, 2007

(65) Prior Publication Data

US 2008/0088508 A1    Apr. 17, 2008

Related U.S. Application Data

(63) Continuation-in-part of application No. 11/688,348, filed on Mar. 20, 2007, which is a continuation-in-part of application No. 11/492,711, filed on Jul. 25, 2006, now Pat. No. 7,429,950, and a continuation-in-part of application No. 11/343,079, filed on Jan. 30, 2006, now Pat. No. 7,375,683, and a continuation-in-part of application No. 11/342,289, filed on Jan. 28, 2006, now Pat. No. 7,576,695, and a continuation-in-part of application No. 11/209,030, filed on Aug. 22, 2005, now Pat. No. 7,248,219, and a continuation-in-part of application No. 11/257,416, filed on Oct. 24, 2005, now Pat. No. 7,495,612, and a continuation-in-part of application No. 11/203,823, filed on Aug. 15, 2005, and a continuation-in-part of application No. 11/145,170, filed on Jun. 6, 2005, now Pat. No. 7,437,250, which is a continuation-in-part of application No. 10/743,042, filed on Dec. 23, 2003, now Pat. No. 7,132,982, which is a continuation-in-part of application No. 10/638,524, filed on Aug. 12, 2003, now Pat. No. 6,806,829, which is a continuation of application No. 09/516,215, filed on Feb. 29, 2000, now Pat. No. 6,633,259, said application No. 10/743,042 is a continuation-in-part of application No. 10/319,725, filed on Dec. 16, 2002, now Pat. No. 6,812,890, said application No. 11/688,348 is a continuation-in-part of application No. 11/649,350, filed on Jan. 3, 2007.

(60) Provisional application No. 60/123,170, filed on Mar. 5, 1999, provisional application No. 60/440,618, filed on Jan. 17, 2003.

(51) Int. Cl.
*G01S 3/02*    (2006.01)

(52) U.S. Cl. .................................. 342/453; 342/463

(58) Field of Classification Search ................ 342/453, 342/454, 463–465; 701/117, 119, 120
See application file for complete search history.

(56) References Cited

U.S. PATENT DOCUMENTS 1,738,571 A    12/1929    Gare ........................... 404/18

(Continued)

FOREIGN PATENT DOCUMENTS

DE    4306660 A1    8/1974

(Continued)

OTHER PUBLICATIONS

Terminal, Landing Fees Increase, Dianne Gouliquer, Northern Ontario Business, Sudbury, Apr. 1, 2001, vol. 21, Issue 6, p. 24.

(Continued)

*Primary Examiner*—Dao L Phan
(74) *Attorney, Agent, or Firm*—Robert Platt Bell (57) ABSTRACT

A system and technique is described which has the capability to track and identify, in real time, various aircraft and objects including Unmanned Aerial Vehicles (UAVs), Unmanned Combat Aerial Vehicles (UCAVs), and Micro Aerial Vehicles (MAVs). The system uses a combination of techniques including conventional automatic dependent surveillance broadcast (ADS-B), transponder multilateration, broadband emitter multilateration, primary and secondary radar, and passive coherent location. A series of enhancement to conventional passive coherent location are described.

8 Claims, 5 Drawing Sheets

U.S. PATENT DOCUMENTS

| | | | |
|---|---|---|---|
| 3,668,403 A | 6/1972 | Meilander | 701/121 |
| 3,705,404 A | 12/1972 | Chisholm | 343/112 R |
| 3,792,472 A | 2/1974 | Payne et al. | 342/32 |
| 4,079,414 A | 3/1978 | Sullivan | 725/114 |
| 4,115,771 A | 9/1978 | Litchford | 343/6 R |
| 4,122,522 A | 10/1978 | Smith | 701/15 |
| 4,167,006 A | 9/1979 | Funatsu et al. | 343/6.5 LC |
| 4,196,474 A | 4/1980 | Buchanan et al. | 364/461 |
| 4,224,669 A | 9/1980 | Brame | 701/8 |
| 4,229,737 A | 10/1980 | Heldwein et al. | 343/6 R |
| 4,293,857 A | 10/1981 | Baldwin | 343/6.5 |
| 4,315,609 A | 2/1982 | McLean et al. | |
| 4,327,437 A | 4/1982 | Frosch et al. | 714/3 |
| 4,359,733 A | 11/1982 | O'Neill | 342/36 |
| 4,454,510 A | 6/1984 | Crow | 343/5 |
| 4,524,931 A | 6/1985 | Nilsson | 246/167 |
| 4,646,244 A | 2/1987 | Bateman | 701/301 |
| 4,688,046 A | 8/1987 | Schwab | 342/456 |
| 4,782,450 A | 11/1988 | Flax | 364/461 |
| 4,811,308 A | 3/1989 | Michel | 367/136 |
| 4,843,397 A | 6/1989 | Galati et al. | 342/59 |
| 4,853,700 A | 8/1989 | Funatsu et al. | 342/30 |
| 4,897,661 A | 1/1990 | Hiraiwa | 342/457 |
| 4,899,296 A | 2/1990 | Khattak | 702/40 |
| 4,910,526 A | 3/1990 | Donnangelo et al. | 342/455 |
| 4,914,733 A | 4/1990 | Gralnick | 340/961 |
| 4,958,306 A | 9/1990 | Powell et al. | 702/40 |
| 5,001,490 A | 3/1991 | Fichtner | 342/195 |
| 5,001,650 A | 3/1991 | Francis et al. | 364/516 |
| 5,017,930 A | 5/1991 | Stoltz | 342/465 |
| 5,025,382 A | 6/1991 | Artz | 364/439 |
| 5,027,114 A | 6/1991 | Kawashima et al. | 340/941 |
| 5,045,861 A | 9/1991 | Duffett-Smith | 342/457 |
| 5,075,680 A | 12/1991 | Dabbs | 342/52 |
| 5,075,694 A | 12/1991 | Donnangelo et al. | 342/455 |
| 5,081,457 A | 1/1992 | Motisher et al. | 342/40 |
| 5,089,822 A | 2/1992 | Abaunza et al. | 342/30 |
| 5,113,193 A | 5/1992 | Powell et al. | 342/25 |
| 5,119,102 A | 6/1992 | Barnard | 342/357 |
| 5,132,695 A | 7/1992 | Sumas et al. | 342/461 |
| 5,138,321 A | 8/1992 | Hammer | 342/36 |
| 5,144,315 A | 9/1992 | Schwab et al. | 342/49 |
| 5,153,836 A | 10/1992 | Fraughton et al. | 364/461 |
| 5,179,384 A | 1/1993 | De Haan | 342/37 |
| 5,191,342 A | 3/1993 | Alsup et al. | 342/465 |
| 5,200,902 A | 4/1993 | Pilley | 364/439 |
| 5,225,842 A | 7/1993 | Brown et al. | 342/357 |
| 5,260,702 A | 11/1993 | Thompson | 340/970 |
| 5,262,784 A | 11/1993 | Drobnicki et al. | 342/45 |
| 5,265,023 A | 11/1993 | Sokkappa | 364/439 |
| 5,268,698 A | 12/1993 | Smith et al. | 342/450 |
| 5,283,574 A | 2/1994 | Grove | 340/970 |
| 5,311,194 A | 5/1994 | Brown | 342/357 |
| 5,317,316 A | 5/1994 | Sturm et al. | 342/30 |
| 5,317,317 A | 5/1994 | Billaud et al. | 342/40 |
| 5,339,281 A | 8/1994 | Narendra et al. | 367/5 |
| 5,341,139 A | 8/1994 | Billaud et al. | 342/40 |
| 5,365,516 A | 11/1994 | Jandrell | 370/18 |
| 5,374,932 A | 12/1994 | Wyschogrod et al. | 342/36 |
| 5,379,224 A | 1/1995 | Brown et al. | 364/449 |
| 5,381,140 A | 1/1995 | Kuroda et al. | 340/961 |
| 5,402,116 A | 3/1995 | Ashley | 340/870.1 |
| 5,406,288 A | 4/1995 | Billaud et al. | 342/37 |
| 5,424,746 A | 6/1995 | Schwab et al. | 342/49 |
| 5,424,748 A | 6/1995 | Pourailly et al. | 342/157 |
| 5,438,337 A | 8/1995 | Aguado | 342/357 |
| 5,448,233 A | 9/1995 | Saban et al. | 340/963 |
| 5,450,329 A | 9/1995 | Tanner | 364/449 |
| 5,454,720 A | 10/1995 | FitzGerald et al. | 434/27 |
| 5,455,586 A | 10/1995 | Barbier et al. | 342/37 |
| 5,471,657 A | 11/1995 | Gharpuray | 455/12.1 |
| 5,486,829 A | 1/1996 | Potier et al. | 342/40 |
| 5,493,309 A | 2/1996 | Bjornholt | 342/455 |
| 5,506,590 A | 4/1996 | Minter | 342/462 |
| 5,515,286 A | 5/1996 | Simon | 364/461 |
| 5,528,244 A | 6/1996 | Schwab | 342/37 |
| 5,534,871 A | 7/1996 | Hidaka et al. | 342/113 |
| 5,541,608 A | 7/1996 | Murphy et al. | 342/442 |
| 5,570,095 A | 10/1996 | Drouilhet, Jr. et al. | 342/357 |
| 5,570,099 A * | 10/1996 | DesJardins | 342/378 |
| 5,583,775 A | 12/1996 | Nobe et al. | 364/449.7 |
| 5,590,044 A | 12/1996 | Buckreub | 364/453 |
| 5,596,326 A | 1/1997 | Fitts | 342/30 |
| 5,596,332 A | 1/1997 | Coles et al. | 342/455 |
| 5,608,412 A | 3/1997 | Welles, II et al. | 342/457 |
| 5,614,912 A | 3/1997 | Mitchell | 342/146 |
| 5,617,101 A | 4/1997 | Maine et al. | 342/358 |
| 5,627,546 A | 5/1997 | Crow | 342/352 |
| 5,629,691 A | 5/1997 | Jain | 340/961 |
| 5,635,693 A | 6/1997 | Benson et al. | 235/384 |
| 5,659,319 A | 8/1997 | Rost et al. | 342/36 |
| 5,666,110 A | 9/1997 | Paterson | 340/970 |
| 5,670,960 A | 9/1997 | Cessat | 342/25 |
| 5,670,961 A | 9/1997 | Tomita et al. | 342/36 |
| 5,677,841 A | 10/1997 | Shiomi et al. | 365/439 |
| 5,680,140 A | 10/1997 | Loomis | 342/357 |
| 5,686,921 A | 11/1997 | Okada et al. | 342/127 |
| 5,714,948 A | 2/1998 | Farmakis et al. | 340/961 |
| 5,732,384 A | 3/1998 | Ellert et al. | 701/120 |
| 5,752,216 A | 5/1998 | Carlson et al. | 701/120 |
| 5,757,315 A | 5/1998 | Aoki | 342/357 |
| 5,774,829 A | 6/1998 | Cisneros et al. | 701/213 |
| 5,781,150 A | 7/1998 | Norris | 342/357 |
| 5,784,022 A | 7/1998 | Kupfer | 342/80 |
| 5,793,329 A | 8/1998 | Nakada et al. | 342/357 |
| 5,798,712 A | 8/1998 | Coquin | 340/970 |
| 5,802,542 A | 9/1998 | Coiera et al. | 711/4 |
| 5,825,021 A | 10/1998 | Uemura | 250/222.1 |
| 5,828,333 A | 10/1998 | Richardson et al. | 342/70 |
| 5,839,080 A | 11/1998 | Muller | 701/9 |
| 5,841,391 A | 11/1998 | Lucas, Jr. et al. | 342/34 |
| 5,841,398 A | 11/1998 | Brock | 342/357 |
| 5,850,420 A | 12/1998 | Guillard et al. | 375/316 |
| 5,867,804 A | 2/1999 | Pilley et al. | 701/120 |
| 5,872,526 A | 2/1999 | Tognazzini | 340/961 |
| 5,884,222 A | 3/1999 | Denoize et al. | 701/301 |
| 5,890,068 A | 3/1999 | Fattouche et al. | 455/456.2 |
| 5,892,462 A | 4/1999 | Tran | 340/961 |
| 5,913,912 A | 6/1999 | Nishimura et al. | 701/35 |
| 5,920,277 A | 7/1999 | Foster et al. | 342/32 |
| 5,920,318 A | 7/1999 | Salvatore, Jr. et al. | 345/418 |
| 5,923,327 A | 7/1999 | Smith et al. | 342/455 |
| 5,936,571 A * | 8/1999 | Desjardins | 342/357.08 |
| 5,949,375 A | 9/1999 | Ishiguro et al. | 342/457 |
| 5,969,674 A | 10/1999 | von der Embse et al. | 342/357.16 |
| 5,977,905 A | 11/1999 | Le Chevalier | 342/163 |
| 5,979,234 A | 11/1999 | Karlsen | 73/170.13 |
| 5,990,833 A | 11/1999 | Ahlbom et al. | 342/417 |
| 5,991,687 A | 11/1999 | Hale et al. | 701/207 |
| 5,995,040 A | 11/1999 | Issler et al. | 342/352 |
| 5,999,116 A | 12/1999 | Evers | 342/36 |
| 6,043,777 A | 3/2000 | Bergman et al. | 342/357 |
| 6,044,322 A | 3/2000 | Stieler | 701/120 |
| 6,049,304 A | 4/2000 | Rudel et al. | 342/357.08 |
| 6,049,754 A | 4/2000 | Beaton et al. | 701/204 |
| 6,075,479 A | 6/2000 | Kudoh | 342/70 |
| 6,081,222 A | 6/2000 | Henkel et al. | 342/45 |
| 6,081,764 A | 6/2000 | Varon | 701/120 |
| 6,085,150 A | 7/2000 | Henry et al. | 701/301 |
| 6,088,634 A | 7/2000 | Muller | 701/9 |
| 6,092,009 A | 7/2000 | Glover | 701/14 |
| 6,094,169 A | 7/2000 | Smith et al. | 342/465 |
| 6,122,570 A | 9/2000 | Muller | 701/9 |

| Patent No. | Kind | Date | Inventor | Class |
|---|---|---|---|---|
| 6,127,944 | A | 10/2000 | Daly | 340/963 |
| 6,133,867 | A | 10/2000 | Eberwine et al. | 342/29 |
| 6,138,060 | A | 10/2000 | Conner | 701/9 |
| 6,147,748 | A | 11/2000 | Hughes | 356/4.09 |
| 6,161,097 | A | 12/2000 | Glass et al. | 705/6 |
| 6,178,363 | B1 | 1/2001 | McIntyre et al. | 701/16 |
| 6,188,937 | B1 | 2/2001 | Sherry et al. | 701/14 |
| 6,195,040 | B1 | 2/2001 | Arethens | 342/357.12 |
| 6,195,609 | B1 | 2/2001 | Pilley | 701/120 |
| 6,201,499 | B1 | 3/2001 | Hawkes et al. | 342/387 |
| 6,208,284 | B1 | 3/2001 | Woodell et al. | 342/30 |
| 6,208,937 | B1 | 3/2001 | Huddle | 701/221 |
| 6,211,811 | B1 | 4/2001 | Evers | 342/36 |
| 6,219,592 | B1 | 4/2001 | Muller et al. | 701/9 |
| 6,222,480 | B1 | 4/2001 | Kuntman et al. | 342/30 |
| 6,225,942 | B1 | 5/2001 | Alon | 342/59 |
| 6,230,018 | B1 | 5/2001 | Watters et al. | 455/456 |
| 6,233,522 | B1 | 5/2001 | Morici | 701/208 |
| 6,239,739 | B1 | 5/2001 | Thomson et al. | 342/96 |
| 6,240,345 | B1 | 5/2001 | Vesel | 701/31 |
| 6,246,342 | B1 | 6/2001 | Vandevoorde et al. | 340/961 |
| 6,253,147 | B1 | 6/2001 | Greenstein | 701/202 |
| 6,271,768 | B1 | 8/2001 | Frazier, Jr. et al. | 340/961 |
| 6,275,172 | B1 | 8/2001 | Curtis et al. | 340/961 |
| 6,275,767 | B1 | 8/2001 | Delseny et al. | 701/120 |
| 6,282,487 | B1 | 8/2001 | Shiomi et al. | 701/120 |
| 6,282,488 | B1 | 8/2001 | Castor et al. | 701/120 |
| 6,289,280 | B1 | 9/2001 | Fernandez-Corbaton | 701/214 |
| 6,292,721 | B1 | 9/2001 | Conner et al. | 701/9 |
| 6,311,127 | B1 | 10/2001 | Stratton et al. | 701/213 |
| 6,314,361 | B1 | 11/2001 | Yu et al. | 701/120 |
| 6,314,363 | B1 | 11/2001 | Pilley et al. | 701/120 |
| 6,317,663 | B1 | 11/2001 | Meunier et al. | 701/16 |
| 6,321,091 | B1 | 11/2001 | Holland | 455/456 |
| 6,327,471 | B1 | 12/2001 | Song | 455/440 |
| 6,329,947 | B2 | 12/2001 | Smith | 342/418 |
| 6,337,652 | B1 | 1/2002 | Shiomi et al. | 342/37 |
| 6,338,011 | B1 | 1/2002 | Furst et al. | 701/1 |
| 6,339,745 | B1 | 1/2002 | Novik | 701/208 |
| 6,340,935 | B1 | 1/2002 | Hall | 340/932.2 |
| 6,340,947 | B1 | 1/2002 | Chang et al. | 342/357.01 |
| 6,344,820 | B1 | 2/2002 | Shiomi et al. | 342/174 |
| 6,347,263 | B1 | 2/2002 | Johnson et al. | 701/14 |
| 6,348,856 | B1 | 2/2002 | Jones et al. | 340/10.1 |
| 6,366,240 | B1 | 4/2002 | Timothy et al. | 342/417 |
| 6,377,208 | B2 | 4/2002 | Chang et al. | 342/357.01 |
| 6,380,869 | B1 | 4/2002 | Simon et al. | 340/945 |
| 6,380,870 | B1 | 4/2002 | Conner et al. | 340/970 |
| 6,384,783 | B1 | 5/2002 | Smith et al. | 342/387 |
| 6,393,359 | B1 | 5/2002 | Flynn et al. | 701/120 |
| 6,396,435 | B1 | 5/2002 | Fleischhauer et al. | 342/70 |
| 6,408,233 | B1 | 6/2002 | Solomon et al. | 701/35 |
| 6,414,629 | B1 | 7/2002 | Curico | 342/357.08 |
| 6,415,219 | B1 | 7/2002 | Degodyuk | 70/117 |
| 6,420,993 | B1 | 7/2002 | Varon | 342/36 |
| 6,445,310 | B1 | 9/2002 | Bateman et al. | 340/970 |
| 6,445,927 | B1 | 9/2002 | Kng et al. | 455/456 |
| 6,448,929 | B1 | 9/2002 | Smith et al. | 342/456 |
| 6,459,411 | B2 | 10/2002 | Frazier et al. | 342/455 |
| 6,462,674 | B2 | 10/2002 | Ohmura et al. | 340/901 |
| 6,463,383 | B1 | 10/2002 | Baiada et al. | 701/120 |
| 6,469,654 | B1 | 10/2002 | Winner et al. | 342/33 |
| 6,469,655 | B1 | 10/2002 | Franke et al. | 342/36 |
| 6,469,664 | B1 | 10/2002 | Michaelson et al. | 342/357.13 |
| 6,473,027 | B1 | 10/2002 | Alon | 342/37 |
| 6,473,694 | B1 | 10/2002 | Akopian et al. | 701/213 |
| 6,477,449 | B1 | 11/2002 | Conner et al. | 701/4 |
| 6,492,932 | B1 | 12/2002 | Jin et al. | 342/25 |
| 6,493,610 | B1 | 12/2002 | Ezaki | 701/3 |
| 6,504,490 | B2 | 1/2003 | Mizushima | 340/943 |
| 6,518,916 | B1 | 2/2003 | Ashihara et al. | 342/70 |
| 6,522,295 | B2 | 2/2003 | Baugh et al. | 342/453 |
| 6,531,978 | B2 | 3/2003 | Tran | 342/29 |
| 6,542,809 | B2 | 4/2003 | Hehls, III | 701/120 |
| 6,542,810 | B2 | 4/2003 | Lai | 701/120 |
| 6,545,631 | B2 | 4/2003 | Hudson et al. | 342/30 |
| 6,549,829 | B1 | 4/2003 | Anderson et al. | 701/16 |
| 6,563,432 | B1 | 5/2003 | Millgard | 340/961 |
| 6,567,043 | B2 | 5/2003 | Smith et al. | 342/450 |
| 6,571,155 | B2 | 5/2003 | Carriker et al. | 701/3 |
| 6,584,400 | B2 | 6/2003 | Beardsworth | 701/120 |
| 6,584,414 | B1 | 6/2003 | Green et al. | 702/33 |
| 6,587,079 | B1 | 7/2003 | Rickard et al. | 342/387 |
| 6,606,034 | B1 | 8/2003 | Muller et al. | 340/970 |
| 6,615,648 | B1 | 9/2003 | Ferguson et al. | 73/146 |
| 6,617,997 | B2 | 9/2003 | Ybarra et al. | 342/29 |
| 6,618,008 | B1 | 9/2003 | Scholz | 342/427 |
| 6,633,259 | B1 | 10/2003 | Smith et al. | 342/456 |
| 6,657,578 | B2 | 12/2003 | Stayton | 342/30 |
| 6,680,687 | B2 | 1/2004 | Phelipot | 342/29 |
| 6,690,295 | B1 | 2/2004 | De Boer | 340/951 |
| 6,690,618 | B2 | 2/2004 | Tomasi et al. | 367/127 |
| 6,691,004 | B2 | 2/2004 | Johnson | 701/14 |
| 6,707,394 | B2 | 3/2004 | Ishihara et al. | 340/970 |
| 6,710,719 | B1 | 3/2004 | Jones et al. | 340/825.49 |
| 6,710,723 | B2 | 3/2004 | Muller | 340/970 |
| 6,714,782 | B1 | 3/2004 | Monot et al. | 455/431 |
| 6,721,652 | B1 | 4/2004 | Sanqunetti | 701/207 |
| 6,744,396 | B2 | 6/2004 | Stone et al. | 342/36 |
| 6,750,815 | B2 | 6/2004 | Michaelson et al. | 342/357.13 |
| 6,751,545 | B2 | 6/2004 | Walter | 701/120 |
| 6,760,387 | B2 | 7/2004 | Langford et al. | 375/267 |
| 6,765,533 | B2 | 7/2004 | Szajnowski | 342/465 |
| 6,789,011 | B2 | 9/2004 | Baiada et al. | 701/120 |
| 6,789,016 | B2 | 9/2004 | Bayh et al. | 701/301 |
| 6,792,058 | B1 | 9/2004 | Hershey et al. | 375/347 |
| 6,798,381 | B2 | 9/2004 | Benner et al. | 342/450 |
| 6,799,114 | B2 | 9/2004 | Etnyre | 701/120 |
| 6,801,152 | B1 | 10/2004 | Rose | 342/13 |
| 6,801,155 | B2 | 10/2004 | Jahangir et al. | 342/90 |
| 6,809,679 | B2 | 10/2004 | LaFrey et al. | 342/37 |
| 6,810,329 | B2 | 10/2004 | Koga | 701/211 |
| 6,812,890 | B2 | 11/2004 | Smith et al. | 342/454 |
| 6,816,105 | B2 | 11/2004 | Winner et al. | 342/37 |
| 6,819,282 | B1 | 11/2004 | Galati et al. | 342/37 |
| 6,823,188 | B1 | 11/2004 | Stern | 455/456.1 |
| 6,828,921 | B2 | 12/2004 | Brown et al. | 340/945 |
| 6,845,362 | B2 | 1/2005 | Furuta et al. | 705/13 |
| 6,861,982 | B2 | 3/2005 | Forstrom et al. | 342/387 |
| 6,862,519 | B2 | 3/2005 | Walter | 701/120 |
| 6,862,541 | B2 | 3/2005 | Mizushima | 702/26 |
| 6,865,484 | B2 | 3/2005 | Miyasaka et al. | 701/213 |
| 6,873,269 | B2 | 3/2005 | Tran | 340/961 |
| 6,873,903 | B2 | 3/2005 | Baiada et al. | 701/120 |
| 6,876,859 | B2 | 4/2005 | Anderson et al. | 455/456.1 |
| 6,882,930 | B2 | 4/2005 | Trayford et al. | 701/117 |
| 6,885,340 | B2 | 4/2005 | Smith et al. | 342/465 |
| 6,900,760 | B2 | 5/2005 | Groves | 342/357.14 |
| 6,912,461 | B2 | 6/2005 | Poreda | 701/120 |
| 6,927,701 | B2 | 8/2005 | Schmidt et al. | 340/959 |
| 6,930,638 | B2 | 8/2005 | Lloyd et al. | 342/453 |
| 6,952,631 | B2 | 10/2005 | Griffith et al. | 701/13 |
| 6,963,304 | B2 | 11/2005 | Murphy | 342/357.02 |
| 6,967,616 | B2 | 11/2005 | Etnyre | 342/182 |
| 6,977,612 | B1 | 12/2005 | Bennett | 342/357.07 |
| 6,985,103 | B2 | 1/2006 | Ridderheim et al. | 342/30 |
| 6,985,743 | B2 | 1/2006 | Bajikar | 455/456.1 |
| 6,992,626 | B2 | 1/2006 | Smith | 342/454 |
| 7,006,032 | B2 | 2/2006 | King et al. | 342/29 |
| 7,012,552 | B2 * | 3/2006 | Baugh et al. | 340/945 |
| 7,026,987 | B2 | 4/2006 | Lokshin et al. | 342/357.12 |
| 7,030,780 | B2 | 4/2006 | Shiomi et al. | 340/961 |
| 7,043,355 | B2 | 5/2006 | Lai | 701/120 |
| 7,050,909 | B2 | 5/2006 | Nichols et al. | 701/301 |
| 7,053,792 | B2 | 5/2006 | Aoki et al. | 340/928 |
| 7,058,506 | B2 | 6/2006 | Kawase et al. | 701/201 |

| | | | |
|---|---|---|---|
| 7,062,381 B1 | 6/2006 | Rekow et al. ............... 701/300 |
| 7,065,443 B2 | 6/2006 | Flynn et al. ................. 701/120 |
| 7,071,843 B2 | 7/2006 | Hashida et al. ........ 340/995.12 |
| 7,071,867 B2 | 7/2006 | Wittenberg et al. ............ 342/70 |
| 7,079,925 B2 | 7/2006 | Kubota et al. .................. 701/1 |
| 7,095,360 B2 | 8/2006 | Kuji et al. ...................... 342/29 |
| 7,102,570 B2 | 9/2006 | Bar-On et al. ................ 342/465 |
| 7,106,212 B2 | 9/2006 | Konishi et al. ............... 340/905 |
| 7,109,889 B2 | 9/2006 | He .............................. 340/971 |
| 7,117,089 B2 | 10/2006 | Khatwa et al. ............... 701/301 |
| 7,120,537 B2 | 10/2006 | Flynn et al. ................. 701/120 |
| 7,123,169 B2 | 10/2006 | Farmer et al. ............... 340/945 |
| 7,123,192 B2 | 10/2006 | Smith et al. ................. 342/455 |
| 7,126,534 B2 | 10/2006 | Smith et al. ................. 342/456 |
| 7,136,059 B2 | 11/2006 | Kraud et al. ................ 345/419 |
| 7,142,154 B2 | 11/2006 | Quilter et al. ........... 342/357.06 |
| 7,148,816 B1 | 12/2006 | Carrico ...................... 340/961 |
| 7,155,240 B2 | 12/2006 | Atkinson et al. .......... 455/456.2 |
| 7,164,986 B2 | 1/2007 | Humphries et al. .......... 701/207 |
| 7,170,441 B2 | 1/2007 | Perl et al. ...................... 342/29 |
| 7,170,820 B2 | 1/2007 | Szajnowski ................. 367/127 |
| 7,187,327 B2 | 3/2007 | Coluzzi et al. ............... 342/458 |
| 7,190,303 B2 | 3/2007 | Rowlan ........................ 342/29 |
| 7,196,621 B2 | 3/2007 | Kochis .................... 340/539.13 |
| 7,206,698 B2 | 4/2007 | Conner et al. ............... 701/301 |
| 7,218,276 B2 | 5/2007 | Teranishi ................. 342/357.1 |
| 7,218,278 B1 | 5/2007 | Arethens ................ 342/367.03 |
| 7,221,308 B2 | 5/2007 | Burton et al. .................. 342/42 |
| 7,228,207 B2 | 6/2007 | Clarke et al. ..................... 701/3 |
| 7,233,545 B2 | 6/2007 | Harvey, Jr. et al. ........... 367/127 |
| 7,248,963 B2 | 7/2007 | Baiada et al. ................ 701/120 |
| 7,250,901 B2 | 7/2007 | Stephens .................... 342/146 |
| 7,257,469 B1 | 8/2007 | Pemble .......................... 701/3 |
| 7,272,495 B2 | 9/2007 | Coluzzi et al. ............... 701/207 |
| 7,277,052 B2 | 10/2007 | Delaveau et al. ............. 342/387 |
| 7,286,624 B2 | 10/2007 | Woo et al. ................... 375/356 |
| 7,307,578 B2 | 12/2007 | Blaskovich et al. ............ 342/29 |
| 7,308,343 B1 | 12/2007 | Horvath et al. ................... 701/3 |
| 7,321,813 B2 | 1/2008 | Meunier ....................... 701/10 |
| 7,333,052 B2 | 2/2008 | Maskell ....................... 342/195 |
| 7,333,887 B2 | 2/2008 | Baiada et al. ................ 701/120 |
| 7,352,318 B2 | 4/2008 | Osman et al. .................. 342/37 |
| 7,358,854 B2 | 4/2008 | Egner et al. ............ 340/539.13 |
| 7,379,165 B2 | 5/2008 | Anderson et al. ........... 356/5.05 |
| 7,382,286 B2 | 6/2008 | Cole et al. ................... 340/961 |
| 7,383,104 B2 | 6/2008 | Ishii et al. ....................... 701/3 |
| 7,383,124 B1 | 6/2008 | Vesel .......................... 701/200 |
| 7,385,527 B1 | 6/2008 | Clavier et al. ............... 340/945 |
| 7,391,359 B2 | 6/2008 | Ootomo et al. ................. 342/37 |
| 7,398,157 B2 | 7/2008 | Sigurdsson et al. .......... 701/213 |
| 7,400,297 B2 | 7/2008 | Ferreol et al. ............... 342/377 |
| 7,408,497 B2 | 8/2008 | Billaud et al. ................. 342/30 |
| 7,408,498 B2 | 8/2008 | Kuji et al. ...................... 342/37 |
| 7,420,501 B2 | 9/2008 | Perl ............................. 342/30 |
| 7,430,218 B2 | 9/2008 | Lee et al. .................... 370/464 |
| 7,437,225 B1 | 10/2008 | Rathinam ...................... 701/14 |
| 7,440,846 B2 | 10/2008 | Irie et al. ..................... 701/200 |
| 7,457,690 B2 | 11/2008 | Wilson, Jr. ....................... 701/3 |
| 7,460,866 B2 | 12/2008 | Salkini et al. ................ 455/431 |
| 7,460,871 B2 | 12/2008 | Humphries et al. ....... 455/456.1 |
| 7,477,145 B2 | 1/2009 | Tatton et al. ................ 340/531 |
| 7,479,919 B2 | 1/2009 | Poe et al. ...................... 342/30 |
| 7,479,922 B2 | 1/2009 | Hunt et al. ............. 342/357.02 |
| 7,479,923 B2 | 1/2009 | Carpenter ............... 342/357.02 |
| 7,479,925 B2 | 1/2009 | Schell ......................... 342/455 |
| 7,487,108 B2 | 2/2009 | Aoki et al. .................... 705/13 |
| 7,501,977 B2 | 3/2009 | Ino ............................... 342/37 |
| 7,504,996 B2 | 3/2009 | Martin ................... 342/357.12 |
| 7,515,715 B2 | 4/2009 | Olive .......................... 380/255 |
| 6,660,563 B1 | 12/2009 | Corcoran, III ............... 701/301 |
| 2001/0014847 A1 | 8/2001 | Keenan ....................... 701/117 |
| 2001/0026240 A1 | 10/2001 | Neher .................... 342/357.07 |
| 2002/0021247 A1 | 2/2002 | Smith et al. ................. 342/450 |
| 2002/0089433 A1 | 7/2002 | Bateman et al. ............. 340/970 |
| 2002/0152029 A1 | 10/2002 | Sainthuile et al. ........... 701/301 |
| 2002/0172223 A1* | 11/2002 | Stilp ........................... 370/480 |
| 2003/0004641 A1 | 1/2003 | Corwin et al. ............... 701/301 |
| 2003/0009267 A1 | 1/2003 | Dunsky et al. .................. 701/4 |
| 2003/0097216 A1 | 5/2003 | Etnyre ........................ 701/120 |
| 2003/0152248 A1 | 8/2003 | Spark et al. ................. 382/103 |
| 2003/0158799 A1 | 8/2003 | Kakihara et al. .............. 705/30 |
| 2004/0002886 A1 | 1/2004 | Dickerson et al. |
| 2004/0004554 A1 | 1/2004 | Srinivasan et al. ...... 340/870.01 |
| 2004/0039806 A1 | 2/2004 | Miras ......................... 709/223 |
| 2004/0044463 A1 | 3/2004 | Shing-Feng et al. ......... 701/120 |
| 2004/0086121 A1 | 5/2004 | Viggiano et al. ............. 380/255 |
| 2004/0094622 A1 | 5/2004 | Vismara ...................... 235/384 |
| 2004/0210371 A1 | 10/2004 | Adachi et al. ................. 701/50 |
| 2004/0225432 A1 | 11/2004 | Pilley et al. ................. 701/117 |
| 2004/0266341 A1 | 12/2004 | Teunon ...................... 455/12.1 |
| 2005/0007272 A1 | 1/2005 | Smith et al. ................. 342/189 |
| 2005/0021283 A1 | 1/2005 | Brinton et al. ............... 702/150 |
| 2005/0046569 A1 | 3/2005 | Spriggs et al. .............. 340/551 |
| 2005/0057395 A1 | 3/2005 | Atkinson |
| 2005/0159170 A1 | 7/2005 | Humphries et al. ....... 455/456.1 |
| 2005/0166672 A1 | 8/2005 | Atkinson ...................... 73/290 |
| 2005/0192717 A1 | 9/2005 | Tafs et al. ....................... 701/3 |
| 2005/0228715 A1 | 10/2005 | Hartig et al. .................. 705/13 |
| 2005/0231422 A1 | 10/2005 | Etnyre ........................ 342/182 |
| 2006/0023655 A1 | 2/2006 | Engel et al. ................. 370/328 |
| 2006/0044184 A1 | 3/2006 | Kimura ................... 342/357.09 |
| 2006/0052933 A1 | 3/2006 | Ota ............................. 701/200 |
| 2006/0119515 A1 | 6/2006 | Smith ......................... 342/450 |
| 2006/0129310 A1 | 6/2006 | Tarrant et al. ............... 701/201 |
| 2006/0161340 A1 | 7/2006 | Lee ............................. 701/207 |
| 2006/0167598 A1 | 7/2006 | Pennarola ..................... 701/11 |
| 2006/0181447 A1 | 8/2006 | Kuji et al. ...................... 342/32 |
| 2006/0191326 A1 | 8/2006 | Smith et al. ..................... 73/73 |
| 2006/0208924 A1 | 9/2006 | Matalon ...................... 340/933 |
| 2006/0250305 A1 | 11/2006 | Coluzzi et al. ............... 342/458 |
| 2006/0262014 A1 | 11/2006 | Shemesh et al. ............. 342/386 |
| 2006/0265664 A1 | 11/2006 | Simons et al. ............... 715/722 |
| 2006/0276201 A1 | 12/2006 | Dupray ..................... 455/456.1 |
| 2007/0001903 A1 | 1/2007 | Smith et al. ................. 342/387 |
| 2007/0040734 A1 | 2/2007 | Evers ......................... 342/126 |
| 2007/0060079 A1 | 3/2007 | Nakagawa et al. ........... 455/131 |
| 2007/0090295 A1 | 4/2007 | Parkinson et al. ........... 250/349 |
| 2007/0106436 A1 | 5/2007 | Johansson ..................... 701/23 |
| 2007/0109184 A1 | 5/2007 | Shyr et al. .............. 342/357.06 |
| 2007/0159356 A1 | 7/2007 | Borel et al. .................. 340/945 |
| 2007/0159378 A1 | 7/2007 | Powers et al. ................. 342/29 |
| 2007/0182589 A1 | 8/2007 | Tran ........................... 340/961 |
| 2007/0213887 A1 | 9/2007 | Woodings ...................... 701/1 |
| 2007/0222665 A1 | 9/2007 | Koeneman .................... 342/29 |
| 2007/0250259 A1 | 10/2007 | Dare .......................... 701/201 |
| 2007/0252750 A1 | 11/2007 | Jean et al. ..................... 342/40 |
| 2007/0298786 A1 | 12/2007 | Meyers et al. ............... 455/431 |
| 2008/0027596 A1 | 1/2008 | Conner et al. ................. 701/16 |
| 2008/0042880 A1 | 2/2008 | Ramaiah et al. ............. 340/958 |
| 2008/0042902 A1 | 2/2008 | Brandwood et al. ......... 342/465 |
| 2008/0062011 A1 | 3/2008 | Butler et al. ................. 340/961 |
| 2008/0063123 A1 | 3/2008 | De Mey et al. .............. 375/350 |
| 2008/0068250 A1 | 3/2008 | Brandao et al. ............... 342/30 |
| 2008/0088508 A1 | 4/2008 | Smith ......................... 342/453 |
| 2008/0106438 A1 | 5/2008 | Clark et al. .................. 340/972 |
| 2008/0106457 A1 | 5/2008 | Bartolini et al. ............... 342/40 |
| 2008/0109343 A1 | 5/2008 | Robinson et al. .............. 705/37 |
| 2008/0117106 A1 | 5/2008 | Sarno et al. ................. 342/444 |
| 2008/0120032 A1 | 5/2008 | Brandao et al. ............. 701/300 |
| 2008/0129601 A1 | 6/2008 | Thomas ...................... 342/465 |
| 2008/0132270 A1 | 6/2008 | Basir ....................... 455/550.1 |
| 2008/0137524 A1 | 6/2008 | Anderson et al. ........... 370/203 |
| 2008/0150784 A1 | 6/2008 | Zhang et al. ................... 342/30 |
| 2008/0158040 A1 | 7/2008 | Stayton et al. ................. 342/32 |
| 2008/0158059 A1 | 7/2008 | Bull et al. ................... 342/387 |
| 2008/0174472 A1 | 7/2008 | Stone et al. .................... 342/30 |

| | | | | |
|---|---|---|---|---|
| 2008/0183344 A1 | 7/2008 | Doyen et al. ............... 701/9 | EP | 1603098 A1 | 12/2005 |
| 2008/0186224 A1 | 8/2008 | Ichiyanagi et al. ......... 342/109 | EP | 1125415 B1 | 1/2006 |
| 2008/0186231 A1 | 8/2008 | Aljadeff et al. ............. 342/387 | EP | 1205732 B1 | 3/2006 |
| 2008/0195309 A1 | 8/2008 | Prinzel, III et al. ......... 701/208 | EP | 1632787 A1 | 3/2006 |
| 2008/0231494 A1 | 9/2008 | Galati .......................... 342/37 | EP | 1632892 A2 | 3/2006 |
| 2008/0252528 A1 | 10/2008 | Shen et al. ................. 342/451 | EP | 0953261 B1 | 6/2006 |
| 2008/0266166 A1 | 10/2008 | Schuchman ................. 342/97 | EP | 1275975 B1 | 6/2006 |
| 2008/0272227 A1 | 11/2008 | Sharpe ...................... 244/3.16 | EP | 1285232 B1 | 6/2006 |
| 2008/0275642 A1 | 11/2008 | Clark et al. ................. 701/208 | EP | 1672384 A2 | 6/2006 |
| 2008/0294306 A1 | 11/2008 | Huynh et al. .................. 701/3 | EP | 0987562 B1 | 7/2006 |
| 2008/0297398 A1 | 12/2008 | Kamimura ................... 342/38 | EP | 1093564 B1 | 11/2006 |
| 2009/0005960 A1 | 1/2009 | Roberts et al. ............. 701/120 | EP | 1218694 B1 | 11/2006 |
| 2009/0009357 A1 | 1/2009 | Heen et al. ............ 340/825.09 | EP | 1727094 A2 | 11/2006 |
| 2009/0012660 A1 | 1/2009 | Roberts et al. ................. 701/3 | EP | 1742170 A1 | 1/2007 |
| 2009/0012661 A1 | 1/2009 | Louis .............................. 701/9 | EP | 1188137 B1 | 2/2007 |
| 2009/0015471 A1 | 1/2009 | Shen et al. ............. 342/357.15 | EP | 1755356 A1 | 2/2007 |
| 2009/0027270 A1 | 1/2009 | Fisher et al. ................. 342/387 | EP | 1463002 B1 | 4/2007 |
| 2009/0051570 A1 | 2/2009 | Clark et al. ................. 340/971 | EP | 1361555 B1 | 5/2007 |
| 2009/0055038 A1 | 2/2009 | Garrec et al. ................. 701/17 | EP | 1798572 A1 | 6/2007 |
| | | | EP | 1410364 B1 | 10/2007 |
| | FOREIGN PATENT DOCUMENTS | | EP | 1843161 A2 | 10/2007 |
| DE | 4204164 A1 | 8/1993 | EP | 1860456 A1 | 11/2007 |
| DE | 19751092 A1 | 6/1999 | EP | 1884462 A2 | 2/2008 |
| DE | 10149006 A1 | 4/2003 | EP | 1101385 B1 | 3/2008 |
| DE | 202004007747 U1 | 9/2004 | EP | 1901090 A1 | 3/2008 |
| DE | 202006005089 U1 | 6/2006 | EP | 0964268 B1 | 4/2008 |
| DE | 102006009121 A1 | 8/2007 | EP | 1483755 B1 | 4/2008 |
| EP | 0265902 A2 | 5/1988 | EP | 1906204 A2 | 4/2008 |
| EP | 0346461 A1 | 12/1989 | EP | 1912077 A2 | 4/2008 |
| EP | 0466239 | 1/1992 | EP | 1331490 B1 | 6/2008 |
| EP | 0514826 A1 | 11/1992 | EP | 1942351 A1 | 7/2008 |
| EP | 0550073 A2 | 7/1993 | EP | 1327159 B1 | 8/2008 |
| EP | 0574009 A3 | 6/1994 | EP | 1436641 B1 | 8/2008 |
| EP | 0613110 A1 | 8/1994 | EP | 1953565 A1 | 8/2008 |
| EP | 0613111 A1 | 8/1994 | EP | 1483902 B1 | 9/2008 |
| EP | 0614092 A1 | 9/1994 | EP | 1965219 A1 | 9/2008 |
| EP | 0629877 A1 | 12/1994 | EP | 1972962 A2 | 9/2008 |
| EP | 0355336 B1 | 8/1995 | EP | 1975884 A1 | 10/2008 |
| EP | 0670566 A2 | 9/1995 | EP | 1118011 B1 | 11/2008 |
| EP | 0682332 A1 | 11/1995 | EP | 1995708 A1 | 11/2008 |
| EP | 0505827 B1 | 6/1996 | EP | 2000778 A2 | 12/2008 |
| EP | 0385600 B1 | 7/1996 | EP | 2001004 A2 | 12/2008 |
| EP | 0732596 A2 | 9/1996 | EP | 2023155 A1 | 2/2009 |
| EP | 0487940 B1 | 1/1997 | FR | 2708349 A1 | 2/1995 |
| EP | 0774148 A1 | 5/1997 | FR | 2791778 A1 | 10/2000 |
| EP | 0578316 B1 | 4/1998 | FR | 2881841 A1 | 8/2006 |
| EP | 0915349 A1 | 5/1999 | JP | 9-288175 A | 11/1994 |
| EP | 1022580 A3 | 2/2001 | JP | 6-342061 A | 12/1994 |
| EP | 1118871 A2 | 7/2001 | JP | 8-146130 A | 5/1996 |
| EP | 0877997 B1 | 12/2001 | JP | 9-119983 A | 11/1996 |
| EP | 0778470 B1 | 5/2002 | WO | WO9205456 A1 | 4/1992 |
| EP | 1202233 A1 | 5/2002 | WO | WO 94/14251 | 6/1994 |
| EP | 0865004 B1 | 7/2002 | WO | WO9427161 A1 | 11/1994 |
| EP | 1109032 B1 | 3/2003 | WO | WO9428437 A1 | 12/1994 |
| EP | 1300689 A2 | 4/2003 | WO | WO9503598 A1 | 2/1995 |
| EP | 1331620 A1 | 7/2003 | WO | WO9521388 A1 | 8/1995 |
| EP | 1345044 A1 | 9/2003 | WO | WO9605562 A1 | 2/1996 |
| EP | 1369704 A1 | 12/2003 | WO | WO9635961 A1 | 11/1996 |
| EP | 1302920 B1 | 2/2004 | WO | WO9726552 A2 | 7/1997 |
| EP | 1396832 A1 | 3/2004 | WO | WO9747173 A2 | 12/1997 |
| EP | 1406228 A2 | 4/2004 | WO | WO9804965 A2 | 2/1998 |
| EP | 1070968 B1 | 5/2004 | WO | WO9805977 A1 | 2/1998 |
| EP | 1431946 A1 | 6/2004 | WO | WO9814926 A1 | 4/1998 |
| EP | 1467575 A1 | 10/2004 | WO | WO9822834 A1 | 5/1998 |
| EP | 1471365 | 10/2004 | WO | WO9822923 A1 | 5/1998 |
| EP | 0903589 B1 | 11/2004 | WO | WO9835311 A1 | 8/1998 |
| EP | 1517281 A2 | 3/2005 | WO | WO9843107 A1 | 10/1998 |
| EP | 1531340 A1 | 5/2005 | WO | WO9849654 A1 | 11/1998 |
| EP | 0926510 B1 | 8/2005 | WO | WO9908251 A1 | 2/1999 |
| EP | 1405286 B1 | 9/2005 | WO | WO9935630 A1 | 7/1999 |
| EP | 1485730 B1 | 9/2005 | WO | WO9942855 A1 | 8/1999 |
| EP | 1428195 B1 | 10/2005 | WO | WO9945519 A2 | 9/1999 |
| | | | WO | WO 99/50985 | 10/1999 |

| | | | |
|---|---|---|---|
| WO | WO9956144 A1 | 11/1999 |
| WO | WO0023816 A1 | 4/2000 |
| WO | WO0039775 A2 | 7/2000 |
| WO | WO0111389 A1 | 2/2001 |
| WO | WO0133302 A2 | 5/2001 |
| WO | WO0148652 A1 | 7/2001 |
| WO | WO0157550 A1 | 8/2001 |
| WO | WO0159601 A1 | 8/2001 |
| WO | WO0163239 A1 | 8/2001 |
| WO | WO0165276 A1 | 9/2001 |
| WO | WO 0186319 | 11/2001 |
| WO | WO0194969 A2 | 12/2001 |
| WO | WO0205245 A2 | 1/2002 |
| WO | WO0208784 A1 | 1/2002 |
| WO | WO0215151 A1 | 2/2002 |
| WO | WO0227275 A2 | 4/2002 |
| WO | WO02054103 A2 | 7/2002 |
| WO | WO02059838 A2 | 8/2002 |
| WO | WO02066288 A1 | 8/2002 |
| WO | WO02069300 A1 | 9/2002 |
| WO | WO02075667 A1 | 9/2002 |
| WO | WO02091312 A2 | 11/2002 |
| WO | WO02095709 A2 | 11/2002 |
| WO | WO02099769 | 12/2002 |
| WO | WO03013010 A1 | 2/2003 |
| WO | WO03016937 A1 | 2/2003 |
| WO | WO03023439 A2 | 3/2003 |
| WO | WO03027934 A1 | 4/2003 |
| WO | WO03054830 A2 | 7/2003 |
| WO | WO03056495 A1 | 7/2003 |
| WO | WO03060855 A1 | 7/2003 |
| WO | WO03067281 A1 | 8/2003 |
| WO | WO03079136 A2 | 9/2003 |
| WO | WO03081560 A1 | 10/2003 |
| WO | WO03093775 A2 | 11/2003 |
| WO | WO03096282 A1 | 11/2003 |
| WO | WO03098576 A1 | 11/2003 |
| WO | WO03107299 A2 | 12/2003 |
| WO | WO2004042418 A1 | 5/2004 |
| WO | WO2004068162 A2 | 8/2004 |
| WO | WO2004109317 A2 | 12/2004 |
| WO | WO2004114252 A1 | 12/2004 |
| WO | WO2005038478 A2 | 4/2005 |
| WO | WO2005052887 A1 | 6/2005 |
| WO | WO2005081012 A1 | 9/2005 |
| WO | WO2005081630 A2 | 9/2005 |
| WO | WO2005114613 A1 | 12/2005 |
| WO | WO2005121701 A2 | 12/2005 |
| WO | WO2005017555 A2 | 5/2006 |
| WO | WO2006070207 A1 | 7/2006 |
| WO | WO2006079165 A1 | 8/2006 |
| WO | WO2006093682 A2 | 9/2006 |
| WO | WO2006108275 A1 | 10/2006 |
| WO | WO2006110973 A1 | 10/2006 |
| WO | WO2006135916 A1 | 12/2006 |
| WO | WO2006135923 A2 | 12/2006 |
| WO | WO2007001660 A2 | 1/2007 |
| WO | WO2007010116 A1 | 1/2007 |
| WO | WO2007012888 A1 | 2/2007 |
| WO | WO2007013069 A1 | 2/2007 |
| WO | WO2007048237 A1 | 5/2007 |
| WO | WO2007086899 A2 | 8/2007 |
| WO | WO2006088554 A1 | 9/2007 |
| WO | WO2007113469 A1 | 10/2007 |
| WO | WO2007115246 A1 | 10/2007 |
| WO | WO2007120588 A2 | 10/2007 |
| WO | WO2007124300 A2 | 11/2007 |
| WO | WO2008001117 A1 | 1/2008 |
| WO | WO2008005012 A1 | 1/2008 |
| WO | WO2008012377 A1 | 1/2008 |
| WO | WO2008018088 A1 | 2/2008 |
| WO | WO2008051292 A2 | 5/2008 |
| WO | WO2008053173 A1 | 5/2008 |
| WO | WO2008065328 A2 | 6/2008 |
| WO | WO2008065658 A1 | 6/2008 |
| WO | WO2008068679 A1 | 6/2008 |
| WO | WO2008093036 A2 | 8/2008 |
| WO | WO2008116580 A1 | 10/2008 |
| WO | WO2008126126 A2 | 10/2008 |
| WO | WO2008144784 A1 | 12/2008 |
| WO | WO2008145986 A2 | 12/2008 |
| WO | WO2009001294 A2 | 12/2008 |
| WO | WO2009004381 A1 | 1/2009 |

OTHER PUBLICATIONS

Conflict Detection and Resolution for Future Air Transport Management, Jimmy Krozel, Ph.D, Mark E. Peters, and George Hunter, TR 97138-01, NASA Ames Research Center, Contract NAS2-14285, Apr. 1997.

ADS-X—Next Generation Surveillance Solutions, Alex Smith, Russell Hulstron, Rannoch Corporation, ATCA Oct. 2006.

Transtech Airport Solutions, Inc., http://www.transtech-solutions.com/products/asm/airport.html, Feb. 12, 2009.

Eurocontrol Standard Document for Surveillance Interchange Part 14: Category 020, Multilateration Target Reports, SUR.ET1.ST05. 2000-STD-14-02, Apr. 2008.

ATO Advanced Technology Development and Prototyping Group, http://222.faa.gov/about/office_org/headquarters_offices/ato/service_units/operations/td/.. Jan. 16, 2008.

Form B-Proposal Summary, NASA SBIR 02-1 Solicitation, http://sbir. nasa.gov/SBIR/abstracts/02/sbir/phase1/SBIR-02-01-A3.01-9714.html Sep. 5, 2002.

Form 9B—Project Summary, NASA SBIR 00-1 Soliciation http://sbir.nasa.gov/SBIR/abstracts/00/sbir/phase1/SBIR-00-1-04.01-9704.html Feb. 12, 2009.

NASA 1998 SBIR Phase 1, Proposal No. 91-1 01.02-9780B (1998) http://sbir.nasa.gov/SBIR/abstracts/98/sbir/phase1/SBIR-98-1-01. 02-9780B.html.

Traffic Alert System Technical Design Summary, Final Report, Apr. 1994 (Baldwin et al.).

GPS Relative Accuracy for Collision Avoidance, Institute of Navigation Technical Meeting, Jan. 1997 (Rudel et al.).

Cassell, R., Smith A., Cohen, B., Yang, E., Sleep, B., A Prototype Aircraft Performance Risk Assessment Model, Final Report, Rannoch Corporation, Feb. 28, 2002.

Cassell, R., Smith A., Cohen, B., Yang, E., Sleep, B., Esche, J., Aircraft Performance Risk Assessment Model (APRAM), Rannoch Corporation, Nov. 30, 2002.

Cox, E., A., Fuzzy Logic for Business and Industry, Charles River Media, 1995, Chapter 5.

Smith, A., Cassell, R., Cohen, B., An approach to Aircraft Performance Risk Assessment Modeling, Final Report, Rannoch Corporation, Mar. 1999.

M.L. Wood and R. W. Bush, "Multilateration on Mode S and ATCRBS Signals at Atlanta's Hartsfield Airport", Lincoln Laboratory, M.I.T., Jan. 8, 1998.

AERMOD: Description of Model Formulation (Version 02222) EPA 454/R-02-002d, Oct. 21, 2002.

FAA Integrated Noise Model, www.faa.gov, current release INM 6.1 (Mar. 4, 2003).

"Flight Explorer News: Flight Explorer and Lochard Team to Provide Enhanced Flight Tracking for Cutomers Worldwide", Apr. 28, 2003, http://www.flightexplorer/com/News/press%20releases/pr042803.asp.

Source Code received by Rannoch Corp. from FAA, circa 1998.

"A Routine that converts an American Mode S address into its corresponding 'N' number string", Ken Banis, Feb. 17, 1992/.

"Description of the U.S. Algorithm for Assigning Mode A Addresses", Robert D. Grappel, M.I.T. Lincoln Laboratory, Nov. 1991.

"Program to convert Mode S address to U.S. Tail Number", R.D. Grappel, M.I.T. Lincoln Laboratory, 1991.

"Program to convert U.S. aircraft tail numbers to Mode S code", R.D. Grappel, M.I.T. Lincoln Laboratory, 1991.

"ADSE and Multilateration Mode-S Data Fusion for Location and Identification on Airport Surface", J.G. Herrero J.A. Portas, F.J. Rodriguez, (*IEEE 1999 Radar Conference Proceedings*, pp. 315-320, Apr. 20-22, 1999).

D.C. Rickard, D.J.Sherry, S.J.Taylor, "The development of a prototype aircraft-height monitoring unit utilising an SSR-based difference in time of arrival technique", International Conference Radar 92 (Conf. Publ. No. 365), 1992, p. 250-3.

D. E. Manolakis and C. C. Lefas, "Aircraft geometric height computation using secondary surveillance radar range differences," IEE Proceedings-F, Radar, Sonar, Navigation, vol. 141, No. 2, pp. 139-148, 1994.

Request for Proposal for Acquisition of Airport Noise and Operations Monitoring System (NOMS), Indianapolis Airport Authority, Oct. 21, 2003.

Technical Specifications, for Aircraft Flight Track and Noise Management System for the Regional Airport Authority of Louisville and Jefferson County, Harris Miller, Miller & Hanson Inc. 15 New England Executive Park Burlington, MA 01803 HMMH Report No. 298950, May 16, 2003.

"Overview of the FAA ADS-B Link Decision", John Scardina, Director, Office of System Architecture and Investment Analysis, Federal Aviation Administration, Jun. 7, 2002.

"Ground-Based Transceiver (GBT) for Broadcast Services Using the Universal Access Transceiver (UAT) Data Link", FAA-E-2973, Department of Transportation, Federal Aviation Administration, Jan. 15, 2004.

"Wide Area Multilateration Report on EATMP TRS 131/04 Version 1.1", NLR-CR-2004-472, Roke Manor, Nov. 2004.

J.G. Herrero, J. A. B. Portas, F.J.J. Rodriguez, J.R.C. Corredera, ASDE and Multilateration Mode-S Data Fusion for Location and Identification on Airport Surface, (*IEEE 1999 Radar Conf. Proc.*, pp. 315-320, Apr. 20-22, 1999).

D.C. Rickard, D.J. Sherry, S.J. Taylor, The development of a prototype aircraft-height monitoring unit utilizing an SSR-based difference in time of arrival technique, Int'l Conference Radar 92 (Conf. Publ. No. 365), 1992, p. 250-3.

D. E. Manolakis and C. C. Lefas, Aircraft geometric height computation using secondary surveillance radar range differences, IEE Proceedings-F, Radar, Sonar, Navigation, vol. 141, No. 2, pp. 139-148, 1994.

GPS Risk Assessment Study, Final Report, T.M. Corrigan et al., Johns Hopkins Univ., Applied Physics Laboratory, Jan. 1999.

Aircraft Noise Report, vol. 17, No. 1, Jan. 31, 200.

ASA MASPS—Change Issue, James Maynard, Oct. 21, 2002.

ADS-B, Automatic Dependent Surveillance—Broadcast Will ADS-B Increase Safety and Security for Aviation?, Mar. 1999, revised Jul. 2000, Darryl H. Phillips AirSport Corporation, 1100 West Cherokee Sallisaw OK 74955.

ASA MASPS—Change Issue, Greg Stayton, Aug. 1, 2002.
ASA MASPS—Change Issue, Michael Petri, Oct. 23, 2002.
ASA MASPS—Change Issue, J. Stuart Searight, Nov. 18, 2002.
ASA MASPS—Change Issue, Michael Petri, Dec. 16, 2002.
ASA MASPS—Change Issue, J. Stuart Searight, Jan. 23, 2003.
ASA MASPS—Change Issue, Tony Warren, Feb. 3, 2003.
ASA MASPS—Change Issue, Steve George, Apr. 23, 2003.
ASA MASPS—Change Issue, James Maynard, Apr. 23, 2003.
ASA MASPS—Change Issue, T.E. Foster, Jun. 11, 2003.
ASA MASPS—Change Issue, Jonathan Hammer et al., Jan. 13, 2004.
ASA MASPS—Change Issue, Tom Mosher, Jan. 13, 2004.
ASA MASPS—Change Issue, Mike Castle, Feb. 13, 2004.
ASA MASPS—Change Issue, Tony Warren, Sep. 10, 2004.
ASA MASPS—Change Issue, Mike Castle, Sep. 10, 2004.
ASA MASPS—Change Issue, Bob Smith, Sep. 1, 2004.
ASA MASPS—Change Issue, Heleberg and Kaliardos, Oct. 15, 2004.
ASA MASPS—Change Issue, Taji Shafaat, Sep. 19, 2004.
ASA MASPS—Change Issue, Stuart Searight, Nov. 3, 2004.
A Radar Substitute—David Hughes, Aviation Week & Space Technology, Mar. 7, 2005.

Statement of ACI-NA and AAAE on Airport Improvement Program Reauthorization before the Senate Aviation Subcommittee on Feb. 12, 1998. David Plavin.

Draft Proposal for the Amendment of the Sub-Cap on Off-Peak Takeoff and Landing Charges at Dublin Airport, Commission for Aviation Regulation, Nov. 23, 2003.

Aviation Infrastructure: Challenges Associated with Building and Maintaining Runways, General Accounting Office, GAO-01-90-T, Oct. 5, 2000.

Airfield Pavement: Keeping Nations Runways in Good Condition Could Require Substantially higher Spending, GAO/RCED-98-226, Jul. 1998.

Albany International Airport Pavement Management System, Albany, New York, Albany International Airport GIS-Based Pavement and Facilities Management, Fall, 2002.

Albany International Airport, New York, Uses GIS for Pavement Management, Lena Weber, Ph.D., GIS Manager, and Pat Rooney, GIS/GPS Technician, C.T. Male Associates, Summer, 2002, http://www.esri.com/news/arcnews/summer02articles/albany-airport.html.

Micropaver, Dr. M.Y. Shahin, CECER-CFF Champaign, IL May 2, 2005.

Raytheon Systems Limited Launches a Unique Solution for ADS-B,. Jan. 19, 2005, Raytheon Corp. http://www.raytheon.co.uk/highlights/ATMS.html.

Raytheon Systems Limited'S ADS-B Solution Prized by International Air Traffic Authorities, Feb. 2, 2005, http://www.raytheon.co.uk/news_room/news/press_02022005.pdf.

Boeing Subsidiary and Megadata Announce Joint Marketing Agreement, Press Release, Aug. 7, 2003.

Federal Airways & Airspace, Inc. Because Accuracy Matters, Feb. 2003, Jan. 2002.

VDL4 TM Alignment With DO-242A (RTCA ADS-B MASPS) WG51/SG2, NASA, Sep. 2003.

Method to Provide System-Wide ADS-B Back-Up, Validation, and Security, A. Smith et al. $25^{th}$ AIAA/IEEE Digital Avionics Systems Conference, Oct. 15, 2006.

*Positive Identification of Aircraft on Surface Movement Area—Results of FAA Trials*, 10th Annual International AeroSense Symposium, Orlando, Florida, Apr. 1996.

*Surveillance Monitoring of Parallel Precision Approaches in a Free Flight Environment*, AIAA 16th Annual Digital Avionics Systems Conference, Oct. 1997.

*Analysis of ADS-B, ASDE-3 and Multilateration Surveillance Performance*—NASA Atlanta Demonstration Presented at the AIAA 17th Annual Digital Avionics Systems Conference in Oct. 1998.

*Application of ADS-B for Airport Surface Surveillance*, Daniel Hicok, Derrick Lee IEEE AIAA $17^{th}$ Annual Digital Avionics Conference, 1998.

*Atlanta Hartsfield International Airport—Results of FAA Trials to Accurately Locate/Identify Aircraft on the Airport Movement Area*, IEEE Plans, Atlanta, GA, Apr. 1996.

*Evaluation of Airport Surface Surveillance Technologies*, IEEE Radar 96 conference, Beijing, China, Oct. 1996.

*Improved Location/Identification of Aircraft/Ground Vehicles on Airport Movement Areas—Results of FAA Trials*, Institute of Navigation in Santa Monica, CA, Jan. 1996.

*Sensis News*, http://www.sensis.com/docs/128/ © 1999-2006.

*Roke Radar, Design and development of miniature radars and fuze sensors through to major radar programme builds*, http://www.roke.co.uk/skills/radar/, © 2006.

*Acoustic System for Aircraft Detection and Tracking, based on Passive Microphone Arrays.* Caronna, Rosello, Testa, $148^{th}$ Meeting of the Acoustical Society of America, http://pcfite.ing.uniroma1.it/upload/research/4psp71107948 2021710.pdf Nov. 2004.

*Cel-Loc How We Do it, Technology Overview*, http://www.cell-loc.com/how_tech.html, Oct. 2, 2006 (original date unknown).

*Super-Radar, Done Dirt Cheap*, http://www.businessweek.com/magazine/content/03_42/b3854113.htm BusinessWeek Online, Oct. 20, 2003.

*Methods to Provide System-Wide ADS-B Back-Up, Validation and Security*, A. Smith, R. Cassell, T. Breen, R. Hulstrom, C. Evers, $25^{th}$ AIAA/IEEE Digital Avionics Systems Conference, Oct. 15, 2006.

Damarel Systems International, Ltd, Travel Automation Specialists, © 2004, www.dameral.com.

Airfield Pavement Computer Software, Mar. 23, 2005, Transport Canada https://www.tc.gc.ca/CivilAviation/International/Technical/Pavement/software.htm.

ARA Transportation, © 2004, http://www.araworldwide.com/expertise/industry/transportation.htm.

*The Twilight Zone, Can Wide-Area Multilateration Systems Become A Nightmare for MSSR Producers?* Aircraft Traffic Technology International 2005, Vladimir Manda, Viktor Sotona.

*Safety, Performance, and Interoperability Requirements Document for ADS-B NRA Application*, European Organisation for Civil Avaiation Equipment, Dec. 2005.

Passive Surveillance Using Multilateration, Roke Manor Research website (2003).

Letter from Marc Morgan, Siemens, Feb. 10, 2006.

*Required Navigation Performance (RNP) and Area Navigation (RNAV)*, Boeing, Aug. 2000.

*System-Wide ADS-B Back-Up and Validation*, A. Smith, R. Cassell, T. Breen, R. Hulstrom, C. Evers, 2006 Integrated Communications, Navigation, and Surveillance Conference.

Required Navigation Performance (RNP) Another step towards global implementation of CNS/ATM, Anita Trotter-Cox, Assessment Compliance Group, Inc. Published in Professional Pilot Magazine, Jun. 1999.

Airport Pavement Management Systems: An Appraisal of Erxisting Methodologies, Michel Gendreau and Patrrick Soriano;Pergamon Transn Res. A, vol. 32, No. 3, pp. 187-214, 1998.

*Components of a Pavement Maintenance Management System*, Mohamed Y. Shahin, U.S. Army Construction Engineering Research Laboratory, Transportaiton Research Record 791, pp. 31-39, 1980.

*Application of Markov Process to Pavement Management Systems at the Network Level*, Abbas Ahmad Butt, University of Iillinois at Urbana-Champaign (1991).

Need for Accurate Traffic Data in Pavement Management, John F. Kennedy International Airport Case Studt, Keegan, Handojo, Rada, MACTEX Engineering and Consulting, Inc, 2004 FAA Worldwide Airport Technology Transfer Conference, Apr. 2004.

Protest Letter dated May 16, 2002 from Otto M. Wildensteiner, U.S. Department of Transportation, Washington, DC.

"Comparison of Claims in U.S. Appl. No. 09/971,672 with Prior Art", May 16, 2002, Otto M. Wildensteiner, Department of Transportation, Washington, DC.

"Minimum Aviation System Performance Standards for Automatic Dependent Surveillance Broadcast (ADS-B)", RCTA, Inc. Washington, DC, Aug. 1998.

"Runway Incursion Reduction Program Dallas-Ft. Worth Formal Evaluation Report, Final Report", Trios Associates, Inc. Dec. 21, 2000.

"TIS-B DFW Application for Airport Surface Situational Awareness", Trios Associates, Inc., Sep. 6, 2000.

"A Prototype Transceiver for Evaluating an Integrated Broadcast Data Link Architecture", Chris Moody & Warrent Wilson, RCTA SC-186, Aug. 17, 1995, RTCA Paper No. 449-95/SC186-033.

"The Universal Access Transceiver (UAT)", Warren Wilson & Chris Moody, May 10, 1995.

"Terminal Area Productivity (TAP) Study Low Visibility Landing and Surface Operations (LVLASO) Demonstration Report" Surface Surveillance Products Team (AND-410) Sep. 4, 1998.

"Phase I—Operational Evaluation Final Report Cargo Airline Association ADS-B Program, FAA SafeFlight 21 Program" Apr. 10, 2000.

"Capstone Program Plan Version 1.0", Federal Aviation Administration, Mar. 10, 1999.

"TIS-B Concept and Approach", MITRE, Chris Moody, Feb. 29, 2000.

"RTCA Special Committee 186, Working Group 5 ADS-B UAT MOPS Meeting #2, Proposed Contents and Transmission Rates for ADS-B Messages" Chris Moody, MITRE Corp., Feb. 20, 2001.

"Airborne Information Initiatives: Capitalizing on a Multi-Purpose Broadcast Communications Architecture", R.C. Strain, J.C. Moody, E.C. Halm, B.E. Dunbar, S. Kavoussi, J.P. Mittelman, Digital Avionics Systems Conference, Oct. 1995.

"Minutes of SC-186 WG-2 (TIS-B) Meeting", Jun. 13-14, 2000.

"UK ADS-B in radar environment" (Mark Watson) http://www.eurocontrol.int/cascade/gallery/content/public/documents/Presentations/ Session% 20% 202% 20-% 20 Trials% 20and% 20 Implementations/Watson%20-% 20UK%20ADS-B%20in%20a%20radar%20environment.pdf (2006).

Ground Vehicle Operations on Airports, FAA Advisory Circular AC No. 150/5210-20 Jun. 21, 2002.

PCL system with illuminator of opportunity, Huaiying tan, Min ren, Bo lie, Jinning Song, Beijing Radar Instiitute, IEEE 0-7803-9582-4/06, Apr. 2006.

High Accurate Multiple Target Detection in PCL Radar Systems; Jafargholi, A. Mousavi, M. R. Nayebi, M. M. K. N. Toosi University of Technology Department of Electrical Engineering, Tehran, Iran; Radar, 2006. CIE '06. International Conference on, Oct. 2006, Shanghai, China; ISBN: 0-7803-9583-2.

Denial of bistatic hosting by spatial-temporal waveform design; H.D. Griffiths, M.C. Wicks, D. Weinder, R. Adve, P.A. Antonik, and I. Fotinopoulos, IEE Proc. Radar Sonar Navig., vol. 152, No. 2, Apr. 2005.

Passive coherent location FPGA implementation of the cross ambiguity function; Kvasnicka, M. Hermanek, A. Kunes, M. Pelant, M. Plsek, R., Proceedings- SPIE The International Society for Optical Engineering; 2006, vol. 6159; Part 1, pp. 615918; International Society for Optical Engineering.

Passive coherent location system simulation and evaluation, Proc. SPIE, vol. 6159, 615917 (2006); DOI:10.1117/12.675065 , Apr. 26, 2006 ; Conference Title: Photonics Applications in Astronomy, Communications, Industry, and High-Energy Physics Experiments IV Libor Slezák, Michael Kvasnicka, Martin Pelant, and Jit Vavra *ERA a.s.* (Czech Republic) Radek Plsek *Technical Univ. of Pardubice* (Czech Republic).

World Airport Week, "Sharing Makes the Airport Go Round" Jan. 21, 1997, p. 1.

Huaiying Tan et al. *PCL System With Illuminator of Opportunity* Proceedings of 2006 CIE International Conference on Radar, vol. 1, Oct. 16, 2006.

Griffiths H D et al., *Denial of Bistatic Hosting by Spatial-Temporal Waveform Design* IEE Proceedings: Radar, Sonar & Navigation, Institution of Electrical Engineers, GB, vol. 152, No. 2, Apr. 8, 2005.

Jafargholi et al, *High Accurate Multiple Target Detection in PCL Radar Systems*, Radar, 2006, CIE '06. International Conference on, IEEE, PI, Oct. 1, 2006.

\* cited by examiner

ENHANCED PASSIVE COHERENT LOCATION TECHNIQUES TO TRACK AND IDENTIFY UAVS, UCAVS, MAVS, AND OTHER OBJECTS

CROSS-REFERENCE TO RELATED APPLICATIONS

The present application is a Continuation-In-Part of U.S. patent application Ser. No. 11/688,348, filed on Mar. 20, 2007, and incorporated herein by reference; application Ser. No. 11/688,348 is a Continuation-In-Part of U.S. patent application Ser. No. 11/492,711, filed Jul. 25, 2006, and incorporated herein by reference; application Ser. No. 11/688,348 is a Continuation-In-Part of U.S. patent application Ser. No. 11/343,079, filed on Jan. 30, 2006, and incorporated herein by reference; application Ser. No. 11/688,348 is also a Continuation-In-Part of U.S. patent application Ser. No. 11/342,289 filed Jan. 28, 2006 and incorporated herein by reference; application Ser. No. 11/688,348 is a Continuation-In-Part of U.S. patent application Ser. No. 11/209,030, filed on Aug. 22, 2005, and incorporated herein by reference; application Ser. No. 11/688,348 is a Continuation-In-Part of U.S. patent application Ser. No. 11/257,416, filed on Oct. 24, 2005, and incorporated herein by reference; application Ser. No. 11/688,348 is a Continuation-In-Part of U.S. patent application Ser. No. 11/203,823 filed Aug. 15, 2005 and incorporated herein by reference; application Ser. No. 11/688,348 is a Continuation-In-Part of U.S. patent application Ser. No. 11/145,170 filed on Jun. 6, 2005 and incorporated herein by reference; application Ser. No. 11/145,170 is a Continuation-In-Part of U.S. patent application Ser. No. 10/743,042 filed Dec. 23, 2003 and incorporated herein by reference; application Ser. No. 10/743,042 is a Continuation-In-Part of U.S. patent application Ser. No. 10/638,524 filed Aug. 12, 2003 and incorporated herein by reference; application Ser. No. 10/638,524 is a Continuation of U.S. patent application Ser. No. 09/516,215 filed Feb. 29, 2000 and incorporated herein by reference; application Ser. No. 09/516,215 claims is a Non Prov. of Provisional U.S. Patent Application Ser. No. 60/123,170 filed Mar. 5, 1999 and incorporated herein by reference; application Ser. No. 10/743,042 is a Continuation-In-Part of U.S. patent application Ser. No. 10/319,725 filed Dec. 16, 2002 and incorporated herein by reference. Application Ser. No. 10/743,042 is a Non Prov. of Provisional U.S. Patent Application Ser. No. 60/440,618 filed Jan. 17, 2003 and incorporated herein by reference; The present application is also a Continuation-In-Part of U.S. patent application Ser. No. 11/649,350, filed Jan. 3, 2007, and incorporated herein by reference.

FIELD OF THE INVENTION

The present invention relates to the field of aircraft tracking. In particular, the present invention is directed toward a method and apparatus using passive coherent techniques for tracking aircraft, aerial vehicles, and other objects.

BACKGROUND OF THE INVENTION

In a report announced on Oct. 9, 2006, the Teal Group (www.tealgroup.com) predicted that the worldwide UAV market will exceed $54 Billion, and that UAV spending will more than triple over the next decade from current worldwide UAV expenditures of $2.7 billion annually to $8.3 billion within a decade, totaling close to $55 billion in the next ten years. The study concludes that the U.S. will account for 77% of the worldwide research and development spending on UAV technology over the next decade, and about 64% of the procurement. These U.S. expenditures represent higher shares of the aerospace market than for worldwide defense spending in general, with the U.S. accounting for about 67% of total worldwide defense research and development spending and 37% of procurement spending, according to the Teal Group.

An article by Charlotte Adams, published in Avionics Magazine in September 2001, reviewed UAV developments at that time. The article noted that, in wingspan, they range from six inches (15 cm) to 247 feet (75 meters). In flight mode, they embrace fixed-wing, rotary-wing, MV-22 Osprey-like vertical takeoff/landing (VTOL), and birdlike, flapping-wing designs. In altitude, they stretch from 50 feet to 100,000 feet, and in mission, range from intelligence, surveillance and reconnaissance (ISR) to weapons launch. The article goes on to describe avionics and sensor payloads on the various vehicles which are summarized here for reference:

Uncooled infrared (IR)
"Panospheric" electro-optical (E/O)
Laser radar (ladar)—Jigsaw
Ku-band, over-the-horizon satcom
Collins ARC210 radios (Rockwell Collins ARC210 AM/FM/UHF/satcom HF radio systems)
Synthetic aperture radar sensors
Ultra wide-band (UWB) sensors. These devices generally radiate about 0.25 watt instantaneous peak power and about 750 microwatts (millionths of a watt) average power providing low probability of intercept/detection and high anti-jam immunity. Sensors discussed in the article operate in the 6-to-6.5-GHz range.)

While it is generally understood that future UAVs operating in controlled airspace will carry air traffic control compliant avionics, such as transponders, there will be, in general, a broad variety of avionics and sensor payloads used on these aircraft. With the advent of new technologies for tracking aircraft within airspace, it may be necessary to provide means for reliably tracking UAVs and the like to prevent collisions with passenger and other aircraft, as well as to prevent collisions with each other, buildings, and other objects. Additionally, passive coherent techniques offer the capability to detect covert enemy aircraft, at high and low altitudes. It remains a requirement in the art, therefore, to provide a means to track UAVs and other aerial vehicles using passive location techniques.

Conventional radar systems comprise a collocated transmitter and receiver, which usually share a common antenna to transmit and receive. A pulsed signal is transmitted and the time taken for the pulse to travel to the object and back allows the range of the object to be determined. Passive Coherent Location (PCL) is a passive radar system, where there is no dedicated transmitter. Instead, the receiver uses third-party transmitters in the environment, and measures the time difference of arrival between the signal arriving directly from the transmitter and the signal arriving via reflection from the object. This allows the bi-static range of the object to be determined. In addition to bi-static range, passive radar will typically also measure the bi-static Doppler shift of the echo and also its direction of arrival. These allow the location, heading and speed of the object to be calculated. In some cases, multiple transmitters and/or receivers can be employed to make several independent measurements of bi-static range, Doppler and bearing and hence significantly improve the final track accuracy.

Figure 1:
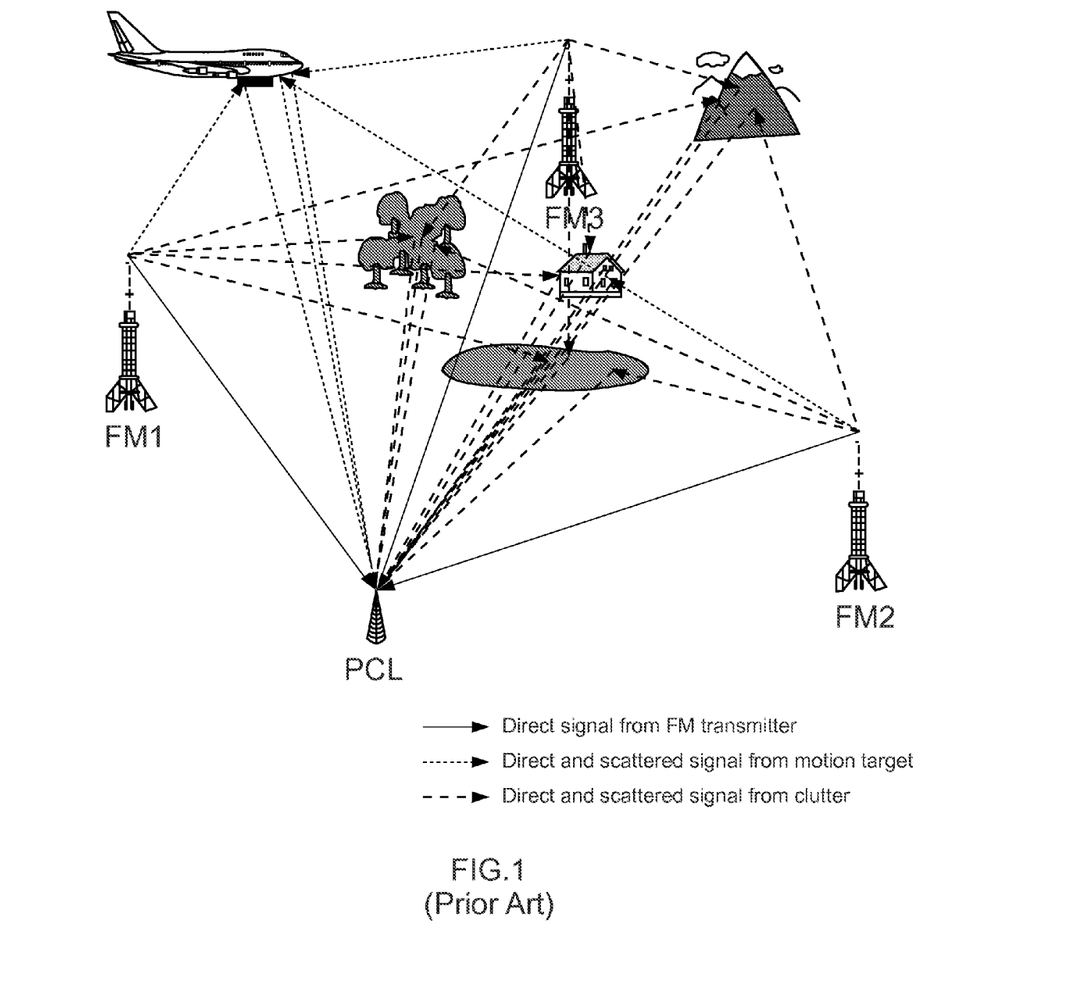
FIG. 1 is a diagram illustrating a typical Prior Art PCL configuration.

The PCL system includes bi-static radar, which measures the elliptical distance and the Doppler frequency shift. It works with CW transmitters of opportunity, meaning that it uses electromagnetic radiation, primarily assigned for another purpose, for example, radio or television terrestrial broadcasts. It is necessary to detect at least two (in an ideal case three or more) direct signals from transmitters for a proper determination of a target position, as shown in FIG. 1. FIG. 1 is a diagram illustrating a typical Prior Art PCL configuration.

From the principles of PCL methodology all targets interacting with the electromagnetic field (having the wavelengths of interest) are detectable. In practice, all flying objects heavier than air are built from some kind of metal materials, carbon composites or at least include some metal parts or wires thereby meeting this requirement.

Conventional aircraft stealth technology is not designed for the frequency bands used by PCL. Stealth technology is designed to minimize the radar cross section (RCS) and is based on achieving an anti-reflective coverage of the aircraft surface and the fuselage shaping from a mono-static RCS point of view. These stealth capabilities are lost at the lower frequency bands, such as VHF for FM radio. Compared to conventional primary active radar, PCL relies on a significantly lower EIRP. This handicap is equalized through the use of a long integration interval in the correlation detector in the receiver, because the reference signal is present with a sufficient signal-to-noise ratio. Weather conditions like rain, snow, hailstones, fog and the like, have only a negligible influence in the frequency bands used by PCL.

A PCL system should be able to detect extremely small signal changes scattered by targets, which are produced by an interaction of the transmitted signal of opportunity and the target. These changes in the scattered signals are about 100 dB or so lower than the direct signal. Moreover, ground clutter is present in the received signals at about 10 to 50 dB higher than the reflected signals, depending on the terrain.

PCL represents a technological challenge, which must be handled both from a precise antenna and receiver technique point of view, but mainly through the use of sophisticated digital signal processing methods. Consequently, before deploying a system it is important to make detailed simulations to evaluate known effects and processes influencing PCL system functionality. An extremely high sensitivity is allowed by a relatively long signal integration period (0.1-1.0 sec) for coherent processing of CW signals. Detection of these signals, which are lower by 100 dB, is possible due to enhanced antennas and signal processing.

As of December 2006, there are several PCL systems in various stages of development or deployment, as follows:

Silent Sentry is a Lockheed Martin (USA) PCL system that uses FM radio transmissions. Two different antenna variants are believed to be available providing an antenna that provides 360° azimuthal coverage from 4 different beams (an Adcock array), and a variant that provides 100° azimuthal coverage from six different beams (linear array). It has a range of up to around 100 nautical miles depending on the variant employed and a number of receive nodes at different locations can be combined to provide increased coverage. (http://www.dtic.mil/ndia/jaws/sentry.pdf).

Celldar is a British system developed jointly by Roke Manor and BAE Systems. The system is a PCL sensor that can exploit GSM signals, currently in the 900 MHz band, but may also be able to use the 900 MHz and 1800 MHz bands simultaneously in the future. The sensor can track targets in 2D over a 100° sector at ranges of up to around 60 km. Celldar is a low level/surface surveillance system designed to achieve good coverage below 10,000 ft. (http://www.roke.co.uk/skills/radar/).

CORA is a German PCL sensor, developed by FGAN (Die Forschungsgesellschaft für Angewandte Naturwissenschaften e.V.), that exploits Digital Video Broadcast—Terrestrial (DVB-T) and Digital Audio Broadcast (DAB) transmissions.

Cristal is a PCL sensor developed by Thales that exploits FM radio transmissions to track targets. In addition to Cristal, it is believed that Thales has a prototype PCL system that uses analogue TV or DAB transmissions.

Figure 2:
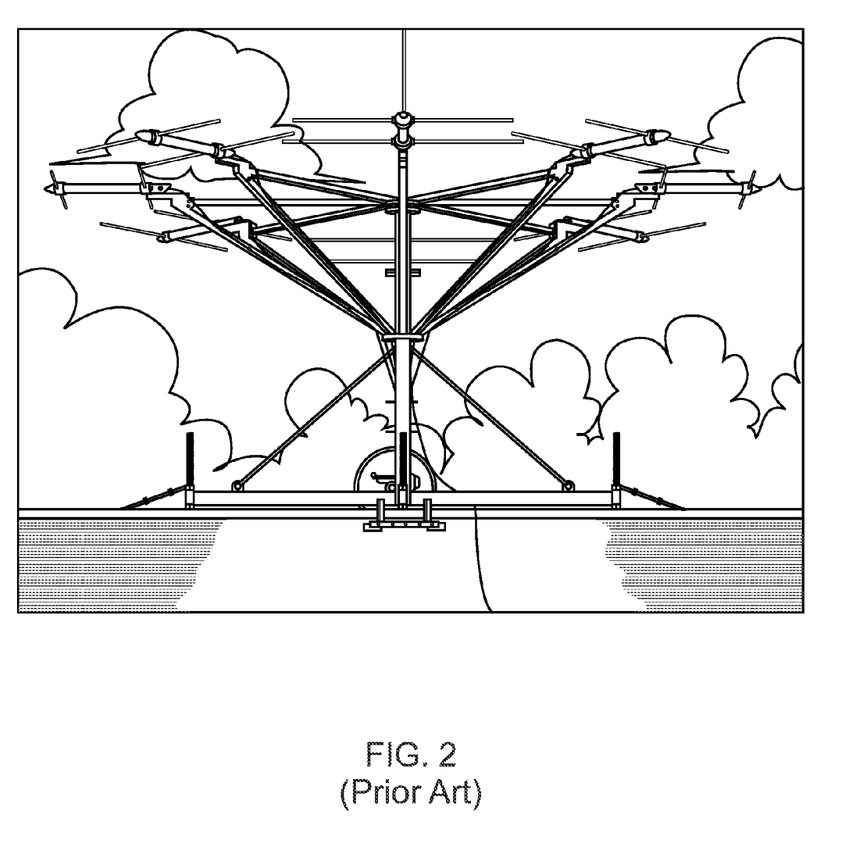
FIG. 2 illustrates an eight-element circular antenna array used in one of the PCL systems developed by ERA Corporation, assignee of the present application.
Figure 3:
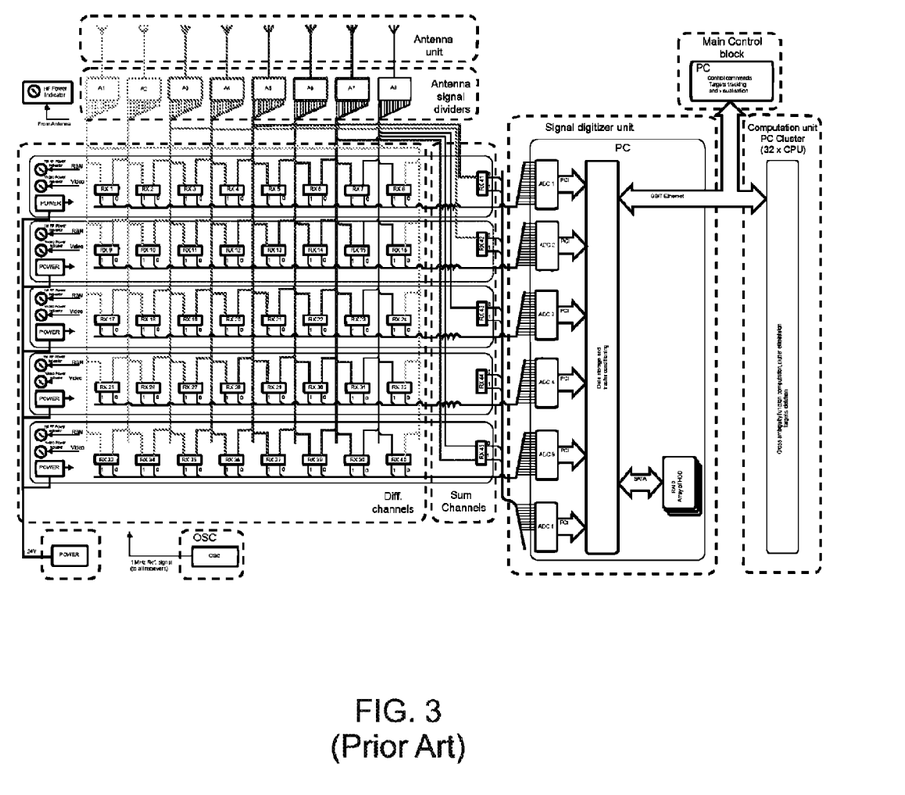
FIG. 3 is a block diagram of an RF, Analog and Digitizer unit used in a Prior Art PCL system of ERA Systems Corporation, assignee of the present application.

One of the PCL systems developed by ERA Systems Corporation, assignee of the present application, (www.rannoch.com) uses an eight-element circular antenna array, as shown in FIG. 2. The system uses an analog VF block (receiver and beam forming network circuits) with high dynamic range and linearity. The digitizer block uses 24-bit high quality A/D converters (up to 100 kHz BW). The DSP engine block uses a parallel multiprocessor cluster as shown in FIG. 3.

The estimated performance of one of ERA's prototype PCL units, based on 3 FM transmitters, and a target with a radar cross section (RCS) of 0 dBsm (1 m$^2$) for 100 MHz is as follows:

System latency time, <2 sec (which is dependent on the actual computing power of the DSP engine)
Region of interest, 200×200 km, 360 degree coverage
Position accuracy, H 250 m, Z 550 m
Horizontal velocity accuracy of 2 m/s
Vertical velocity accuracy of 8 m/s
50 simultaneously tracked targets To give a measure of the security appeal of PCL, a recent U.S. Government request for information (RFI) was released to industry (http://www.hsarpabaa.com/Solicitations/MPCL-SOURCES-SOUGHT-NOTICE_final.pdf). That request from the Homeland Security Advanced Research Projects Agency (HSARPA) of the Department of Homeland Security, Science and Technology Directorate (DHS S&T) was issued for information regarding passive coherent localization (PCL) techniques for detection of surface targets on water and land. In the RFI, HSARA stated that they were looking for new and innovative technical approaches to detection and tracking using multi-static localization through PCL, where targets of interest include small and large vessels in coastal waters, ports and waterways and vehicles and persons crossing border areas.

HSARA went on to state that an envisioned system should be able to meet the following requirements:

Be capable of providing coverage over either a major port or harbor area (such as Miami, New York, Hampton Roads, or Puget Sound) or along extended coastlines (such as the Florida Keys, Gulf Coast, and Long Island Sound).
Be capable of detecting a 25-foot boat (estimated to be −5 to 0 dBsm radar cross section) at 3 knots or a jet ski at 10 knots.
Be capable of distinguishing between surface targets and low flying fixed and rotary winged aircraft.
Be capable of tracking a target with an accuracy of better than 100 meters.
Be capable of separating and distinguishing targets 50 meters apart.
Be capable of developing and maintaining a complete surface track picture in the area of concern.
Be capable of an update rate of less than 10 seconds and a latency of less than 5 seconds.

Many militaries and security agencies around the world are exploring the utility of PCL. In a report on Chinese developments from the Taipei Times http://www.taipeitimes.com/News/archives/1999/11/30/0000013001/wiki, incorporated herein by reference, it was reported back in 1999 that China was close to deploying an anti-aircraft defence system that uses technology so advanced it can track even stealth-type warplanes. According to a recent Newsweek article, US analysts expressed worries that the new early-warning defence system could defeat current US Air Force tactics against enemy air defences.

The Newsweek article went on to state that current defences use radar to track incoming aircraft, but outgoing signals can be found and jammed or destroyed. The "passive" technology the Chinese are believed to have, detects aircraft by monitoring disruptions in commercial radio and TV signals, and are essentially undetectable, Newsweek reported. The technology, which could detect US stealth aircraft, including the F-117 bomber and perhaps even the futuristic F-22 fighter, has so alarmed the defense community that top military and industry experts have been called to discuss the strategic implications. At the time, the military in Taiwan, however, said it was unlikely the development of PCL technology by China has been taken beyond the theoretical stage.

The patents and published patent applications listed below and incorporated herein by reference, describe various methods and enhancements to perform passive coherent location using a receiver subsystem which receives reference signals from an uncontrolled transmitter and scattered transmissions originating from the uncontrolled transmitter and scattered by an object.

U.S. Pat. No. 7,012,552, incorporated herein by reference, describes a passive coherent location system which enhances object state awareness to track several approaching airborne objects. The system including a receiver subsystem to receive reference signals from an uncontrolled transmitter and scattered transmissions originating from the uncontrolled transmitter and scattered by approaching airborne objects. A front-end processing subsystem determines a radial velocity of the object, based on the received transmissions, and buffers digitized transmission replicas of the received transmissions. A back-end processing subsystem receives the digitized transmission replicas of the received transmissions and determines object state estimates based on the determined radial velocity. The front-end processing subsystem and back-end processing subsystem are remotely located relative to one another. U.S. Pat. No. 7,012,552 goes on to describe a method for determining when the object is within a predetermined distance from a ground location.

U.S. Pat. No. 7,019,692, incorporated herein by reference, describes a system for narrowband pre-detection signal processing for passive coherent location applications. The apparatus receives an input signal including a target signal and a reference signal. The reference signal is received on a direct path from an uncontrolled transmitter along with the target signal, which comprises the reference signal reflected from a target. The received signals are passed in two paths for parallel processing. Each of the paths includes a target channel and a reference channel for the target signal and the reference signal, respectively, and one of the paths is for correlation signal processing. U.S. Pat. No. 7,019,692 claims a method for narrowband pre-detection signal processing for passive coherent location applications. According to that method, an input signal is received, including a target signal reflected from a target. A coherent processing interval is selected. The system performs motion compensation by accepting tracker feedback for a target. Motion compensation is performed over the coherent processing interval.

U.S. Pat. No. 6,839,026, incorporated herein by reference, describes a system and method for narrowband pre-detection signal processing for passive coherent location applications. The method comprises the steps of receiving a first reference signal and a first target signal, filtering the first reference signal with respect to the first target signal using a filter to form a first output reference signal, and combining the first output reference signal with the first target signal to form a first output target signal, receiving a second reference signal and a second target signal, updating the filter with respect to a difference between the first target signal and the second target signal, filtering the second reference signal using the updated filter to form a second output reference signal, and combining the second output reference signal with the second target signal to form a second output target signal.

U.S. Pat. No. 6,798,381, incorporated herein by reference, describes a system for measurement of domain data association in passive coherent location applications. The patent describes a method for associating a detection report having measurements to a line track, where the line track correlates to a signal transmitted from a source of opportunity, reflected from a target, and detected by a passive coherent location system. The method comprises the steps of estimating a line track state vector from measurements using a set of Kalman filters wherein the measurements are at least partially derived by comparing the signal to a reference transmission from a source of opportunity, and initializing the line track. U.S. Pat. No. 6,798,381 describes a system for measurement data association of detection reports to a line track within a passive coherent location system. The detection reports correlate to target signals transmitted from a source of opportunity, reflected from a target, and received at the passive coherent location system. The system comprises a state estimation means to associate new detection reports with existing line tracks and to estimate update states for extending line tracks, wherein the new detection reports are at least partially derived by comparing the target signal to a reference transmission from a source of opportunity, a line track merge means to merge line tracks, a line track termination means to terminate line tracks according to a specified criteria, and a line track initialization means to initiate new line tracks for unassociated detection reports.

U.S. Pat. No. 6,738,021, incorporated herein by reference, describes a system for detection and feature extraction in passive coherent location applications which includes a method for detecting and extracting target information during a coherent processing interval within a passive coherent location system. The patent describes a method including the steps of forming an ambiguity surface having ambiguity surface data for the coherent processing interval, identifying bins from a previous ambiguity surface, associating bins from the previous ambiguity surface with ambiguity surface data, and identifying new bins for new target echoes within the ambiguity surface. U.S. Pat. No. 6,738,021 also describes a method for detecting and extracting target data for targets within a coherent processing interval in a passive coherent location system. The method includes the steps of generating an ambiguity surface, associating bins with the ambiguity surface, forming peak detections from the bins and a plurality of old bins from a previous ambiguity surface, wherein the peak detections correlate to target echoes within the coherent processing interval, and estimating target parameters from peak detections.

U.S. Pat. No. 6,710,743, incorporated herein by reference, describes a system for central association and tracking in passive coherent location applications that uses a method for associating a line track with a target for a passive coherent location system, wherein the passive coherent location system uses comparison data from a direct and a reflected signal emitted from one or more transmitters geographically separated from a receiver. The system receives a detection report at least partly derived from comparison data, a detection report having a line track corresponding to the target. A target state is computed using measurements of the line track; computing a state covariance using a measurement of the line track. The line track Is scored according to the target state covariance and the line track is assigned to a target track according to the scoring.

U.S. Pat. No. 6,710,743 also describes a method for associating and tracking target data within a passive coherent location system, where the target data include measurements from a direct and a reflected signal emitted from one or more transmitters geographically separated from a receiver. A target state and a state covariance are computed from the measurements, where the measurements at least partly comprise the comparison data from direct and reflected signals. A line track is assigned correlating the target data to a target track according to the target state and state covariance. The target track is initialized and a filter is initialized according to the target state and state covariance. The target track is tracked with the filter and the target data is extrapolated from the target track.

U.S. Pat. No. 6,703,968, incorporated herein by reference, describes a system and method for mitigating co-channel interference in passive coherent location applications. The system identifies a primary illuminator signal from a primary illuminator, where the primary illuminator signal comprises a frequency-modulated carrier at a given frequency. The primary illuminator signal is regenerated and cancelled from the co-channel signals. A secondary illuminator signal is identified from a secondary illuminator, where the secondary illuminator signal comprises a frequency-modulated carrier at a given frequency. The secondary illuminator signal is regenerated and cancelled from the co-channel signals.

U.S. Pat. No. 6,522,295, incorporated herein by reference, describes a passive coherent location system for enhancing object state awareness. A receiver subsystem receives a reference signal from an uncontrolled transmitter and scattered transmissions originating from the uncontrolled transmitter and scattered by an object. A front-end processing subsystem determines a radial velocity of the object based on the received transmissions and buffers digitized transmission replicas of the received transmissions. A back-end processing subsystem receives the digitized transmission replicas and determines object state estimates based on the determined radial velocity.

U.S. Pat. No. 6,522,295 goes on to describe a method for determining an updated state estimate for an object. A reference transmission is received from an uncontrolled transmitter, along with a scattered transmission that originated from the uncontrolled transmitter and scattered by the object. The received transmissions are compared to determine a frequency-difference-of-arrival and a previous state estimate is updated based on the determined frequency-difference-of-arrival. Digitized transmission replicas of the received transmissions are buffered, where the digitized replicas are received by a back-end processing subsystem.

Published U.S. Patent Application 2003/0001778, incorporated herein by reference, describes a system for detection and feature extraction in passive coherent location applications. The system includes generating an ambiguity surface and associating bins with the ambiguity surface. The method also includes forming peak detections from the bins where the peak detections correlate to target echoes within the coherent processing interval. The method also includes estimating targets parameters from the peak detections.

U.S. Pat. No. 6,930,638, incorporated herein by reference, describes a passive method of detecting an object. A receiver receives a first signal transmitted by a mobile phone base station, along with a second signal comprising the first signal transmitted by a mobile phone base station after it has been reflected off an object. The first and second signals are compared to derive data relating to position or speed of movement of the object. The method further comprising providing a plurality of mobile phone base stations which transmit a signal, such that as the object moves out of range of one base station, it comes into range for another, whereby the distance of the object from a base station being used to determine a position of the object remains substantially constant and distance of the object from the receiver changes, thereby improving the received power and range.

SUMMARY OF THE INVENTION

A system and technique is described which has the capability to track and identify, in real time, various aircraft and objects including Unmanned Aerial Vehicles (UAVs), Unmanned Combat Aerial Vehicles (UCAVs), and Micro Aerial Vehicles (MAVs). The system uses a combination of techniques including conventional automatic dependent surveillance broadcast (ADS-B), transponder multilateration, broadband emitter multilateration, primary and secondary radar, and passive coherent location. A series of enhancements to conventional passive coherent location are described. The use of an enhanced PCL system to track and categorize these and other targets is described, along with the integration of tracking and identification data from other sources.

The present invention includes a system for tracking an object by receiving a reference transmission from a controlled or uncontrolled transmitter, and a scattered transmission that originated from a controlled or uncontrolled transmitter and scattered by the object, comparing the received transmissions to determine a frequency-difference-of-arrival thereby establishing a track or tracks for the object or objects, and updating each track on a predetermined periodic basis, and forwarding each track to the system's processing unit for filtering and display. The transmissions may include one or more of FM radio, Digital Video Broadcast Terrestrial (DVB-T), Digital Audio Broadcast (DAB), and the Global System for Mobile Communications (GSM).

The present invention also includes a system for narrowband pre-detection signal processing for passive coherent location applications. Input signals include a target signal and a reference signal, the reference signal being received on a direct path from a controlled or uncontrolled transmitter and the target signal comprising the reference signal reflected from a target. The target signal and the reference signal are correlated in a signal processing unit using a database of a priori illuminator signals to discriminate between reference signals and target signals.

The present invention also includes a method for mitigating co-channel interference in passive coherent location applications. A database is used to store a priori knowledge of the proximate illuminator signals, wherein the illuminator signals comprise one or more of FM radio, Digital Video Broadcast Terrestrial (DVB-T), Digital Audio Broadcast (DAB), and the Global System for Mobile Communications (GSM). Illuminators are then generated from the database and used to cancel the illuminator signals from the co-channel signals to remove co-channel interference.

The present invention includes a system and method for continuously detecting and extracting target information using a series of samples within a passive coherent location system. An ambiguity surface is formed having ambiguity surface data for the series of samples. This ambiguity surface then forwards the extracted target information to the central processing system for comparison with a database of predetermined target type characteristics.

The present invention also includes a method for associating detections to a line track, where the line track correlates to a signal transmitted from a controlled or uncontrolled source, reflected from a target, and detected by a passive coherent location system. A line track vector is determined from a series of measurements using a set of adaptive or other filters wherein the measurements are at least partially derived by comparing the signal to a reference transmission from the controlled or uncontrolled source. A track comparable to conventional air traffic control radar systems is generated, including the two air traffic control tracker states of track and coast.

In another embodiment of the present invention, combined portable or fixed multilateration, ADS-B, PET, and PCL receiver systems share the same mast, power, communications, and infrastructure for ease of deployment.

In another embodiment of the present invention, a mobile or fixed based system is employed which combines PET and PCL to provide real time tracking and characterization or identification of cooperative and non cooperative targets including land, sea, and airborne targets.

In another embodiment of the present invention, the PET includes direction finding using the phase of the received target emissions and Time Difference of Arrival (TDOA) processing of the received target emissions.

In another embodiment of the present invention, the PCL includes TDOA processing of signals reflected by the cooperative and non-cooperative targets.

In another embodiment of the present invention, the characterization or identification may include electronic intelligence or fingerprinting of target emissions, as well as target classification based on modulation of the reflected signals.

In another embodiment of the present invention, a mobile or fixed based system combines PET and PCL to share the same system infrastructure.

In another embodiment of the present invention, the PET and the PCL are co-mounted on the same mast and use the same communications channels from the sensors to the central server.

In another embodiment of the present invention, the PET may be mounted on a plurality of masts having all or a subset equipped with PCL sensors, and each PCL sensor may track based on the same or different frequency bands, including terrestrial and satellite based radio, television, and other CW sources.

In another embodiment of the present invention, correlation of aircraft tracking and aircraft identification is made using a number of sources including ADS-B, multilateration, broadband passive emitter tracking, SSR, primary radar, and PCL.

In another embodiment of the present invention, prioritization of data sources is used to provide comprehensive surveillance and a back up or validation to the preferred sources used for air traffic control.

In another embodiment of the present invention, electronic intelligence from broadband passive emitter tracking coupled with PCL extracted target characteristics is used to provide high confidence in target identification and classification.

In another embodiment of the present invention, a look up table or database of PET and or PCL features is used for vehicles, vessels, and aircraft, including UAVs, UCAVs, MAVs and other objects.

DETAILED DESCRIPTION OF THE INVENTION

Figure 4:
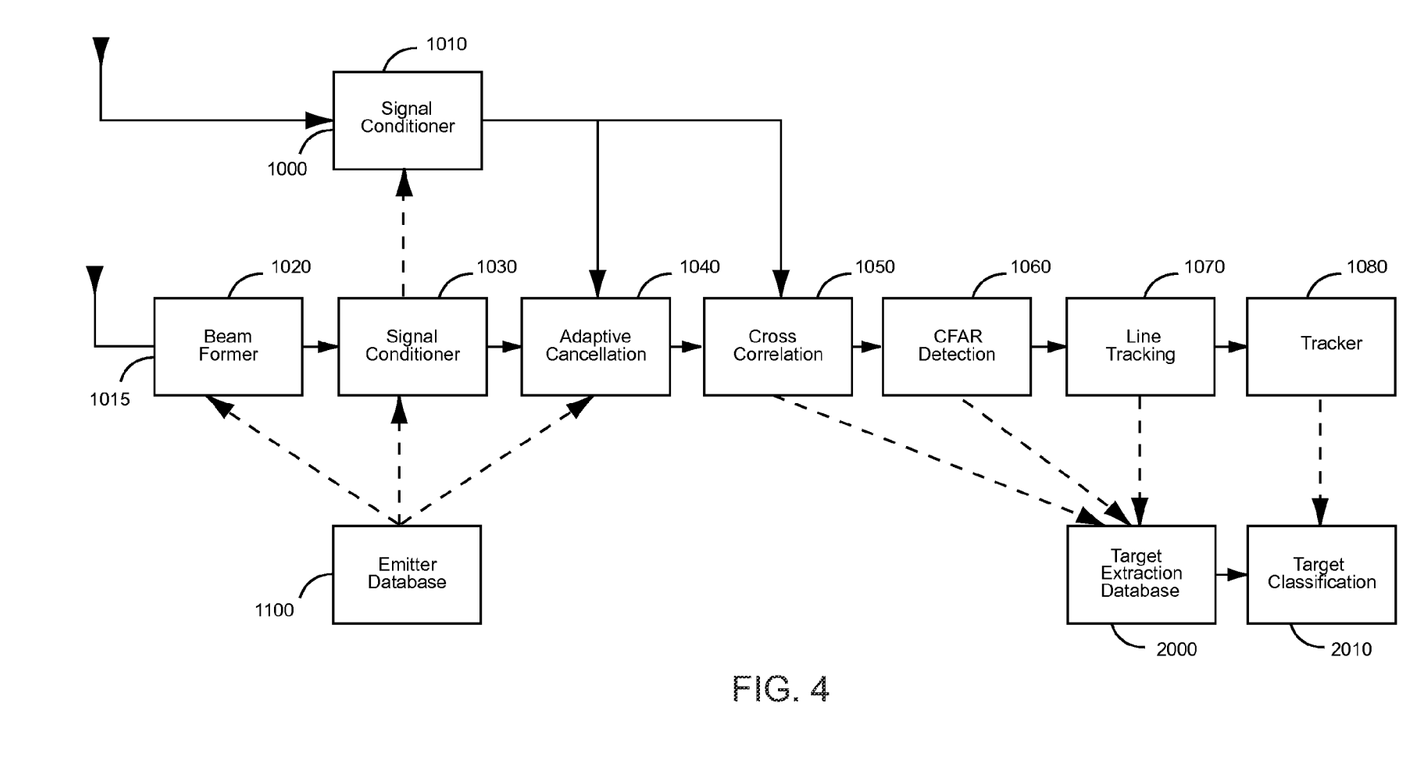
FIG. 4 is a block diagram of a first embodiment of the present invention.

Referring to FIG. 4, in a first embodiment of the present invention, a PCL tracking and identification system is provided as a standalone system. Referring to FIG. 4, reference signal antenna 1000 passes the various reference signals to the signal conditioner 1010. The beam forming antenna 1015 passes the reflected signals through beam former 1010 to the signal conditioner 1030. Like most passive radar systems that use simple antenna arrays with several antenna elements and element-level digitization, this allows the direction of arrival of echoes to be calculated using standard radar beam forming techniques, such as amplitude monopulse using a series of fixed, overlapping beams or more sophisticated adaptive beam forming.

Signal conditioners 1010 and 1030 perform some transmitter-specific conditioning of the signal before cross-correlation processing. Conditioning includes analogue band-pass filtering of the signal, equalization to improve the quality of the reference signal, and removal of unwanted structures in digital signals to improve the radar ambiguity function. A major metric in the detection range for most passive radar systems is the signal-to-interference ratio, due to the large and constant direct signal received from the transmitter. An adaptive filter 1040 using the reference emitter 1100 removes the direct signal ensuring that the range/Doppler sidelobes of the direct signal do not mask the smaller echoes in the cross-correlation stage 1050.

The cross-correlation function 1050 acts as the matched filter and also provides the estimates of the bi-static range and bi-static Doppler shift of each target echo. Since analog and digital broadcast signals are noise-like in nature, and only correlate with themselves, the cross-correlation processing 1050 uses a bank of matched filters, each matched to a different target Doppler shift. This may use an efficient implementation of the cross-correlation processing based on the discrete Fourier transform, as described in the paper *Using Reconfigurable HW for High Dimensional CAF Computation*, by A. Hermanek, M. Kunes, and M. Kvasnicka, at the Institute of Information Theory and Automation, Academy of Sciences of the Czech Republic, Prague, Czech Republic, 2003, incorporated herein by reference.

Targets are detected on the cross-correlation surface by applying an adaptive threshold, and declaring all returns above this surface to be targets. A standard averaging constant false alarm rate (CFAR) algorithm or more advanced algorithms may be used as illustrated in block 1060. The line-tracking function 1070 tracks target returns from individual targets, over time, in the range-Doppler space produced by the cross-correlation processing. A standard Kalman filter may be used to reject most false alarms during this stage of the processing.

For the tracking function 1080, a simple bi-static configuration using one transmitter and one receiver may be employed or the target state (position, heading, velocity) may be derived from the measurement set of bi-static range, bearing and Doppler using a non-linear filter, such as a extended Kalman filter. When multiple transmitters are used from the database, a target may be detected by each transmitter and the returns from the target will appear at a different bi-static range and Doppler shift from each transmitter and so it is necessary to associate the returns from each of the transmitters. The target is located accurately with an approach that combines the measurements from each transmitter using a non-linear filter, such as an extended Kalman filter.

The feature extraction element 2000 uses a processing function to detect targets and determine target parameters from ambiguity surface data. The system may use a peak/noise discriminator to compare previous ambiguity surface data to the ambiguity surface data and to update bins correlating to the previous ambiguity surface data. Target classification 2010 is performed through comparing the extracted features, e.g., rotorcraft information, to a database of information 2000.

Figure 5:
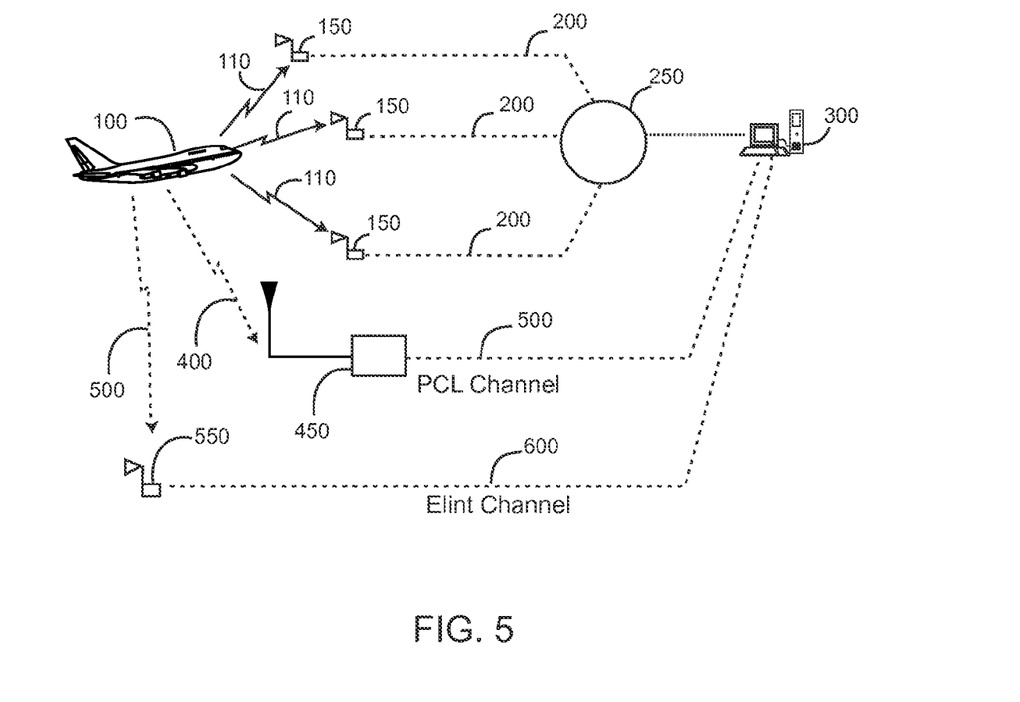
FIG. 5 is a block diagram of a second embodiment of the present invention.

Referring to FIG. 5, in a second embodiment of the present invention, PCL tracking and identification is combined with other sources. This embodiment shows the utility of PCL when integrated with other sources of surveillance that include ADS-B, multilateration, broadband emitter tracking, or Passive Emitter Tracking (PET), as well as identification information from all sources including electronic intelligence (ELINT). Aircraft 100 is flying with the range of multilateration/ADS-B receivers and broadband PET receivers, shown as combined receivers for this embodiment 150. Multilateration/ADS-B/PET sensor data is sent to central server 250 using a variety of communications media, including either of fiber, telephone line, wireless, or satellite communications 200.

The PCL channel consists of a reference antenna and a beam-forming network and is shown separately as 450 but in practice may be co-located with the other sensors 150. The PCL information is processed to provide tracks and target classification 450 and the data sent to the central server. Finally, the ELINT channel, which provides electronic "fingerprinting" associated with the PET tracking provides data on the types of emitter payload of each target. Therefore, at central server 300 the tracking consists of the fusion of the following sources, where available:

ADS-B
Multilateration
Broadband PET
PCL
SSR
Primary Radar

The target identification consists of the fusion of the following data where available:

ADS-B/Mode S identification
Mode A/C squawk
PET ELINT fingerprinting and emitter classification
PCL target extraction and classification While the preferred embodiment and various alternative embodiments of the invention have been disclosed and described in detail herein, it may be apparent to those skilled in the art that various changes in form and detail may be made therein without departing from the spirit and scope thereof.

I claim:

1. A system for tracking an object, comprising:
   a receiver receiving a reference transmission on a direct path from a controlled or uncontrolled transmitter, and a scattered transmission originating from a controlled or uncontrolled transmitter, scattered by the object, and then received by the receiver;
   a comparator comparing the received transmissions to determine a frequency-difference-of-arrival thereby establishing a track or tracks for the object or objects, the comparator comprising a subsystem for narrowband pre-detection signal processing receiving input signals include the target transmission and the reference transmission, and correlating the target transmission and the reference transmission using a database of a priori illuminator signals to discriminate between reference transmissions and target transmissions; and
   a tracker updating each track on a predetermined periodic basis, and forwarding each track to the system's processing unit for filtering and display.

2. The system of claim 1, wherein the transmissions include one or more of FM radio, Digital Video Broadcast Terrestrial (DVB-T), Digital Audio Broadcast (DAB), and Global System for Mobile Communications (GSM).

3. The system of claim 1, wherein the system combines one or more of portable and fixed multilateration, ADS-B, Passive Emitter Tracking (PET), and Passive Coherent Location (PCL) receiver systems sharing the same antenna mast, power, communications, and infrastructure for ease of deployment.

4. The system of claim 1 wherein the system combines a mobile or fixed based system combines Passive Emitter Tracking (PET) and Passive Coherent Location (PCL) to provide real-time tracking and characterization or identification of cooperative and non cooperative targets including land, sea, and airborne targets.

5. The system of claim 4, wherein the PET includes direction finding using phase of received target emissions and Time Difference of Arrival (TDOA) processing of the received target emissions.

6. The system of claim 4, where the PCL includes TDOA processing of signals reflected by cooperative and non-cooperative targets.

7. The system of claim 4, wherein the characterization or identification includes electronic intelligence of target emissions and target classification based on modulation of the reflected signals.

8. The system of claim 4, further comprising:
   a signal conditioner performing transmitter-specific conditioning of the received scattered transmission including analogue band-pass filtering of the signal, equalization to improve the quality of the reference transmission, and removal of unwanted structures in the signals.

* * * * *